US011927449B2

(12) United States Patent
Schroeter et al.

(10) Patent No.: US 11,927,449 B2
(45) Date of Patent: Mar. 12, 2024

(54) USING MAP-BASED CONSTRAINTS FOR DETERMINING VEHICLE STATE

(71) Applicant: NVIDIA CORPORATION, Santa Clara, CA (US)

(72) Inventors: Derik Schroeter, Fremont, CA (US); Di Zeng, Sunnyvale, CA (US); Mark Damon Wheeler, Saratoga, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 355 days.

(21) Appl. No.: 16/898,005

(22) Filed: Jun. 10, 2020

(65) Prior Publication Data

US 2020/0386555 A1 Dec. 10, 2020

Related U.S. Application Data

(60) Provisional application No. 62/859,493, filed on Jun. 10, 2019.

(51) Int. Cl.
G01C 21/30 (2006.01)
G01S 17/89 (2020.01)
G01S 19/42 (2010.01)

(52) U.S. Cl.
CPC .............. G01C 21/30 (2013.01); G01S 17/89 (2013.01); G01S 19/42 (2013.01)

(58) Field of Classification Search
CPC ................................ G01C 21/26; G01C 21/30
See application file for complete search history.

(56) References Cited

U.S. PATENT DOCUMENTS

| 4,963,864 A * | 10/1990 | Iihoshi | G01C 21/30 |
| | | | 340/995.22 |
| 5,359,529 A * | 10/1994 | Snider | G01C 21/30 |
| | | | 73/178 R |
| 5,436,840 A * | 7/1995 | Lam | G01C 21/30 |
| | | | 701/445 |
| 5,523,765 A * | 6/1996 | Ichikawa | G01C 21/30 |
| | | | 342/357.31 |
| 6,192,312 B1 * | 2/2001 | Hummelsheim | G01C 21/30 |
| | | | 340/988 |
| 10,359,290 B2 * | 7/2019 | Felix | G01C 21/32 |
| 10,684,132 B2 * | 6/2020 | Johnston | G08G 1/0968 |
| 2011/0241935 A1 * | 10/2011 | Miocinovic | G01C 21/30 |
| | | | 342/357.31 |
| 2019/0265046 A1 * | 8/2019 | Agarwal | G01S 7/4808 |

FOREIGN PATENT DOCUMENTS

| JP | 2005226999 A * | 8/2005 | |
| WO | WO-0239063 A1 * | 5/2002 | G01C 21/30 |

* cited by examiner

Primary Examiner — Cassi J Galt
(74) Attorney, Agent, or Firm — Maschoff Brennan

(57) ABSTRACT

According to an aspect of an embodiment, operations may comprise receiving an approximate geographic location of a vehicle, accessing a map of a region within which the approximate geographic location of the vehicle is located, identifying a first region on the map within a first threshold distance of the approximate geographic location of the vehicle, identifying a second region on the map associated with one or more roads on the map, determining a search space on the map within which the vehicle is likely to be present, the search space representing an intersection of the first region and the second region, and determining a more accurate geographic location of the vehicle by performing a search within the search space.

33 Claims, 17 Drawing Sheets

USING MAP-BASED CONSTRAINTS FOR DETERMINING VEHICLE STATE

CROSS-REFERENCE TO A RELATED APPLICATION

This patent application claims the benefit of and priority to U.S. Provisional App. No. 62/859,493 filed Jun. 10, 2019, which is incorporated by reference in the present disclosure in its entirety for all that it discloses.

FIELD

The embodiments discussed herein are related to maps for autonomous vehicles, and more particularly using map-based constraints for determining vehicle state.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving an approximate geographic location of a vehicle. The operations may also comprise accessing a map of a region within which the approximate geographic location of the vehicle is located, the map comprising information about roads at least partially located within the region. The operations may also comprise identifying a first region on the map within a first threshold distance of the approximate geographic location of the vehicle. The operations may also comprise identifying a second region on the map associated with a road on the map that is nearest to the approximate geographic location of the vehicle. The operations may also comprise determining a search space on the map within which the vehicle is likely to be present, the search space representing an intersection of the first region and the second region. The operations may also comprise determining a more accurate vehicle geographic location of the vehicle by performing a search within the search space.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
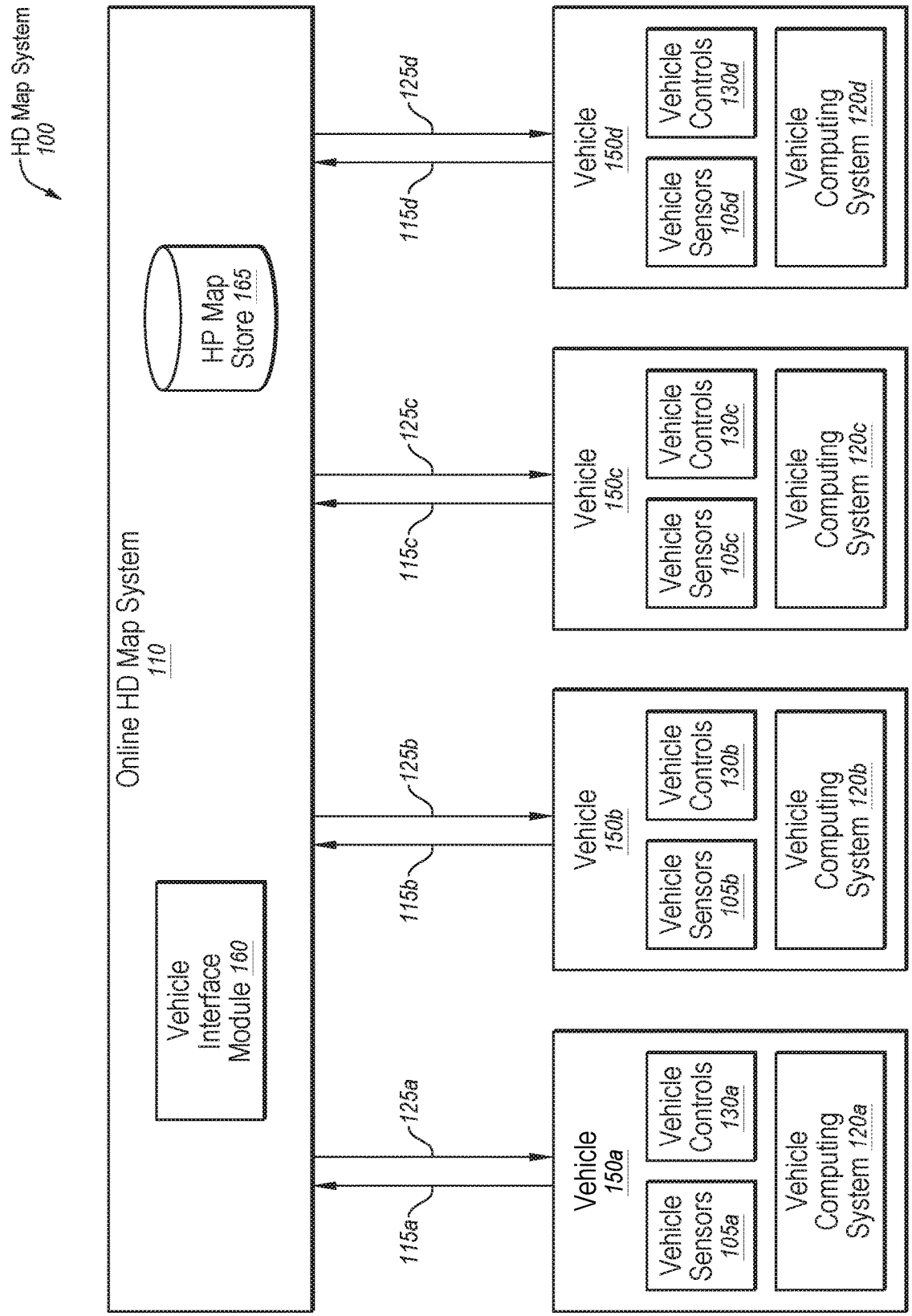
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may use map-based constraints for determining vehicle state. For example, when an autonomous vehicle begins navigation along a road, and at various other time during the navigation of the autonomous vehicle, map-based constraints may be employed to determine vehicle state. For example, the vehicle state of an autonomous vehicle may include a current pose of the vehicle, which may include a current geographic location of the vehicle, and map-based constraints may be employed to determine the current geographic location of the vehicle. While an approximate geographic location of the vehicle may be obtained using GPS or GNNS, a more accurate geographic location of the vehicle may be obtained by accessing an HD map of the region within which the approximate geographic location of the vehicle is located, and then using additional sensors (e.g., a light detection and ranging sensor (LIDAR) mounted on the vehicle) to search within the HD map.

However, as noted above, an HD map for a given geographic region may be too large to store on a local storage of the autonomous vehicle, and may also be too large to efficiently search through to determine a more accurate geographic location of the vehicle. To reduce the size of the map that must be accessed and searched while determining a more accurate geographic location of the vehicle, a smaller search space on the map may be defined as the intersection of a first region on the map and a second region on the map. The first region may be defined as region within a first threshold distance (e.g., 100 meters) of the approximate geographic location of the vehicle. The second region may be defined as a region associated with a road on the map that is nearest to the approximate geographic location of the vehicle. The search space of the HD map (e.g., where the first and second regions intersect) may be significantly smaller, and involve less data, than the entire region of the HD map. Thus, searching only through the search space (e.g., repeatedly during vehicle navigation) to determine a more accurate geographic location of the vehicle may be significantly faster and more efficient (e.g., due to searching through significantly less data) than searching through the entire HD map (e.g., which would require searching through significantly less data).

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
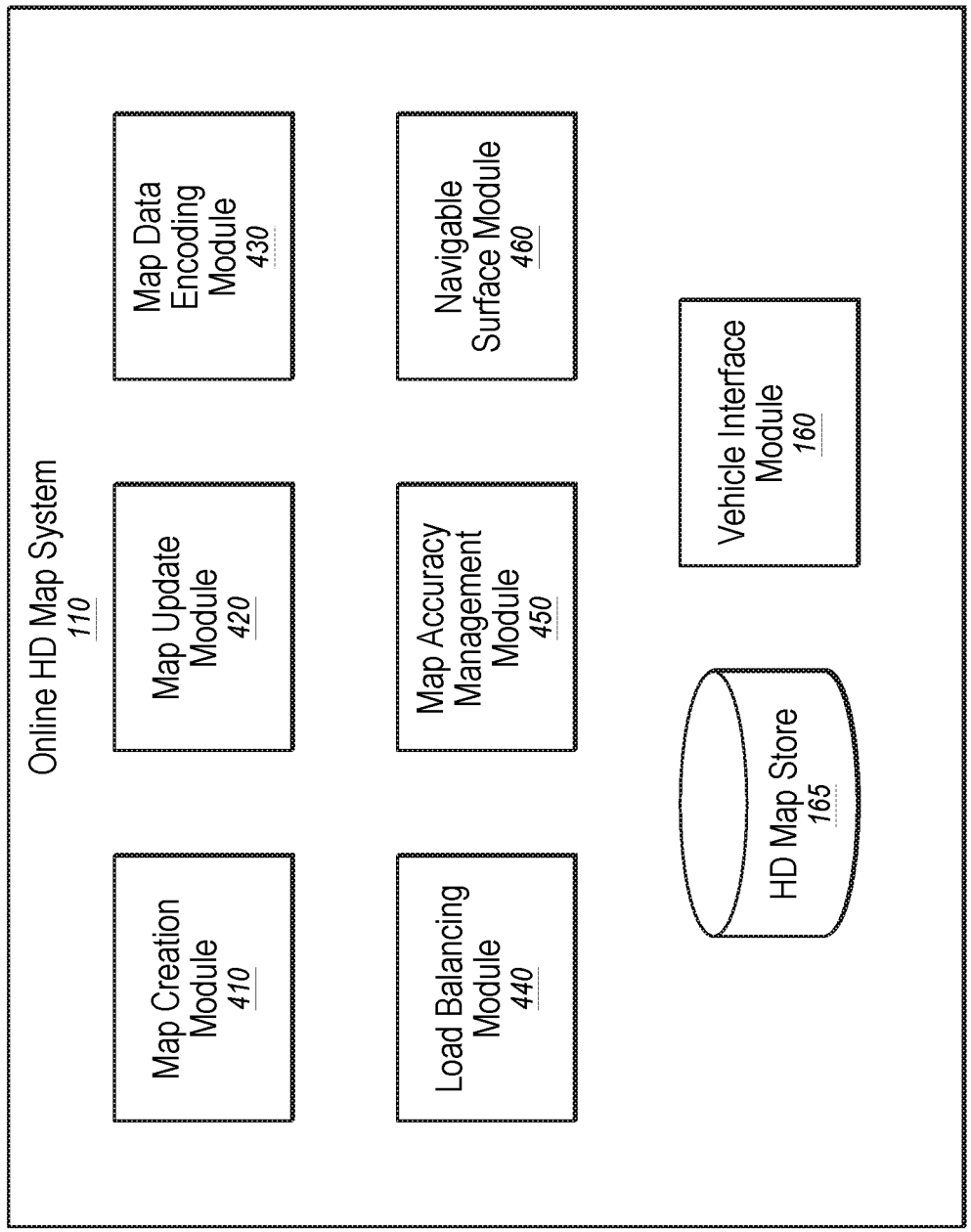
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
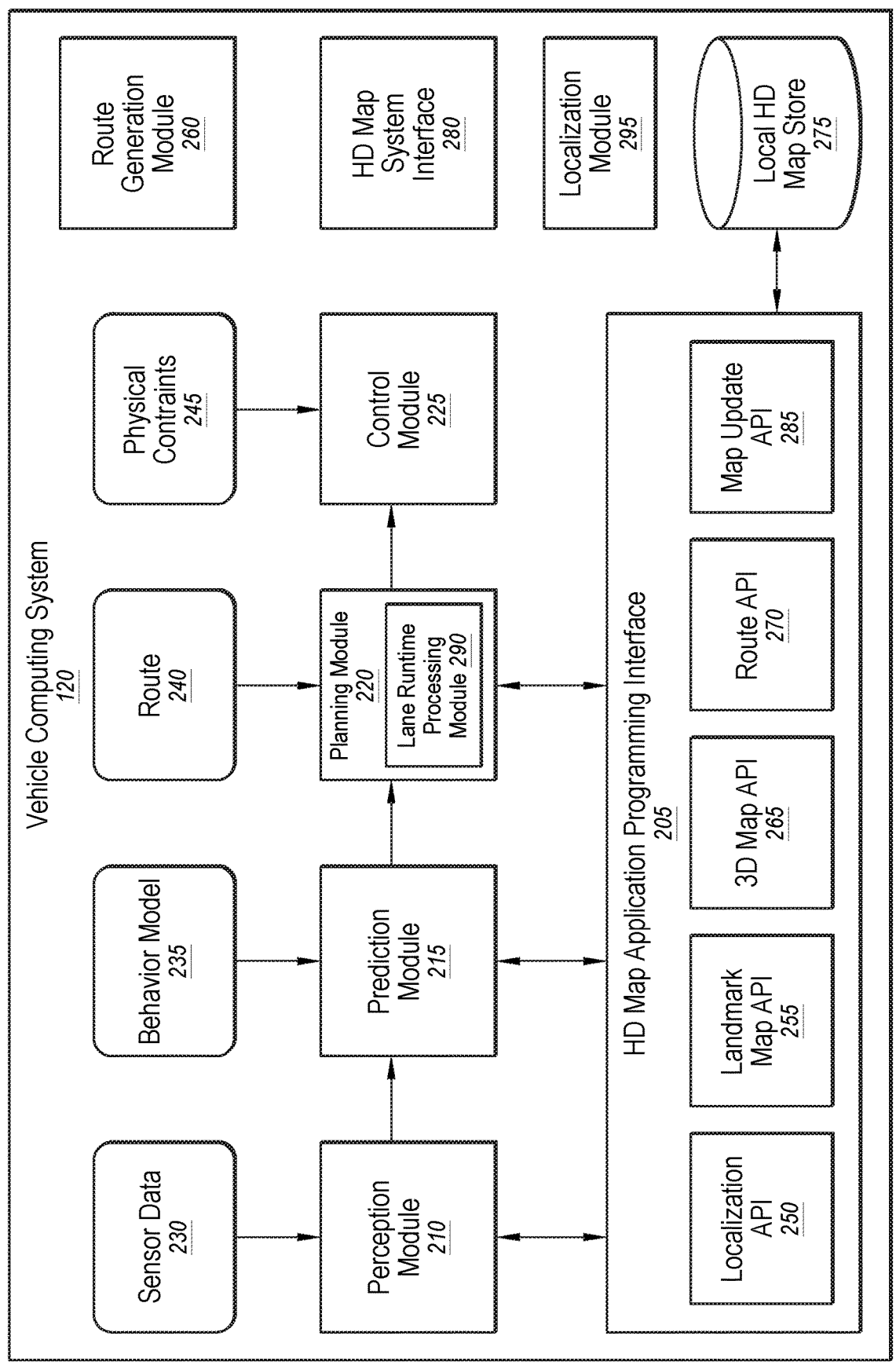
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220 that may include a lane runtime processing module 290, a control module 225, a localization module 295, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
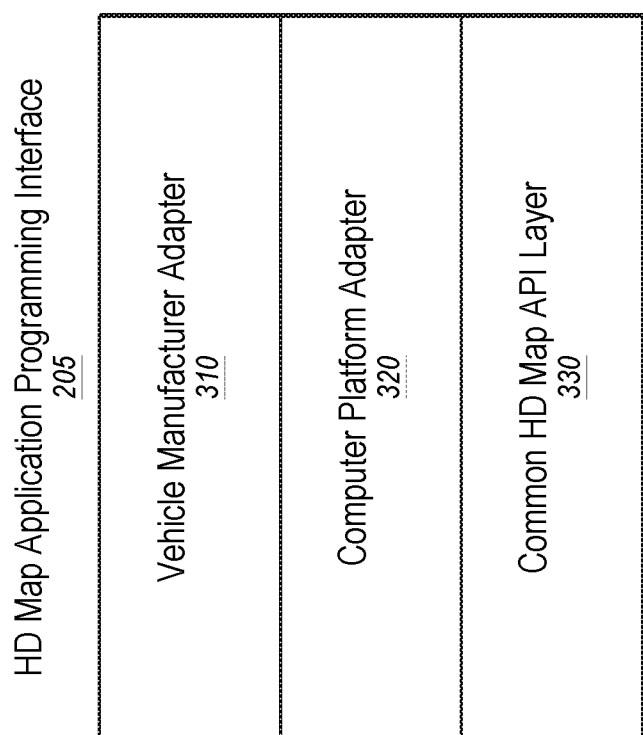
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, a navigable surface module 460, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
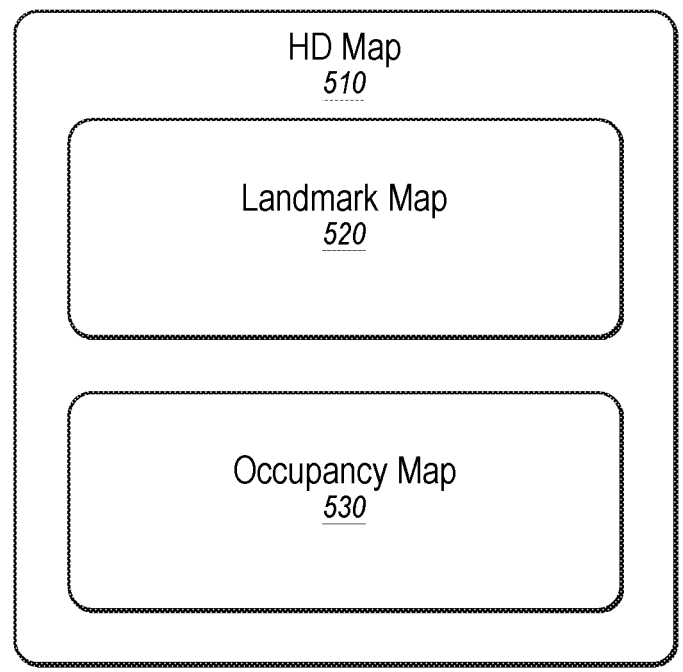
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
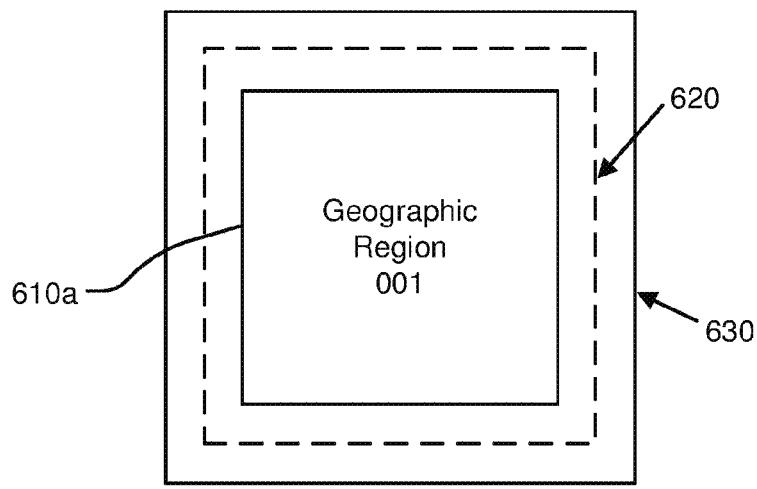
FIGS. 6A-6B illustrate example geographical regions defined in an HD map.
Figure 6B:
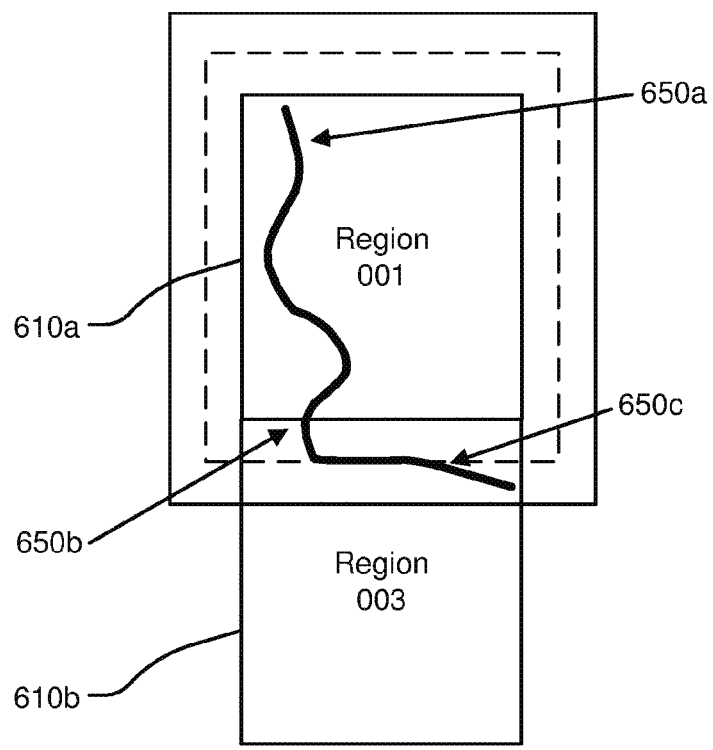

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
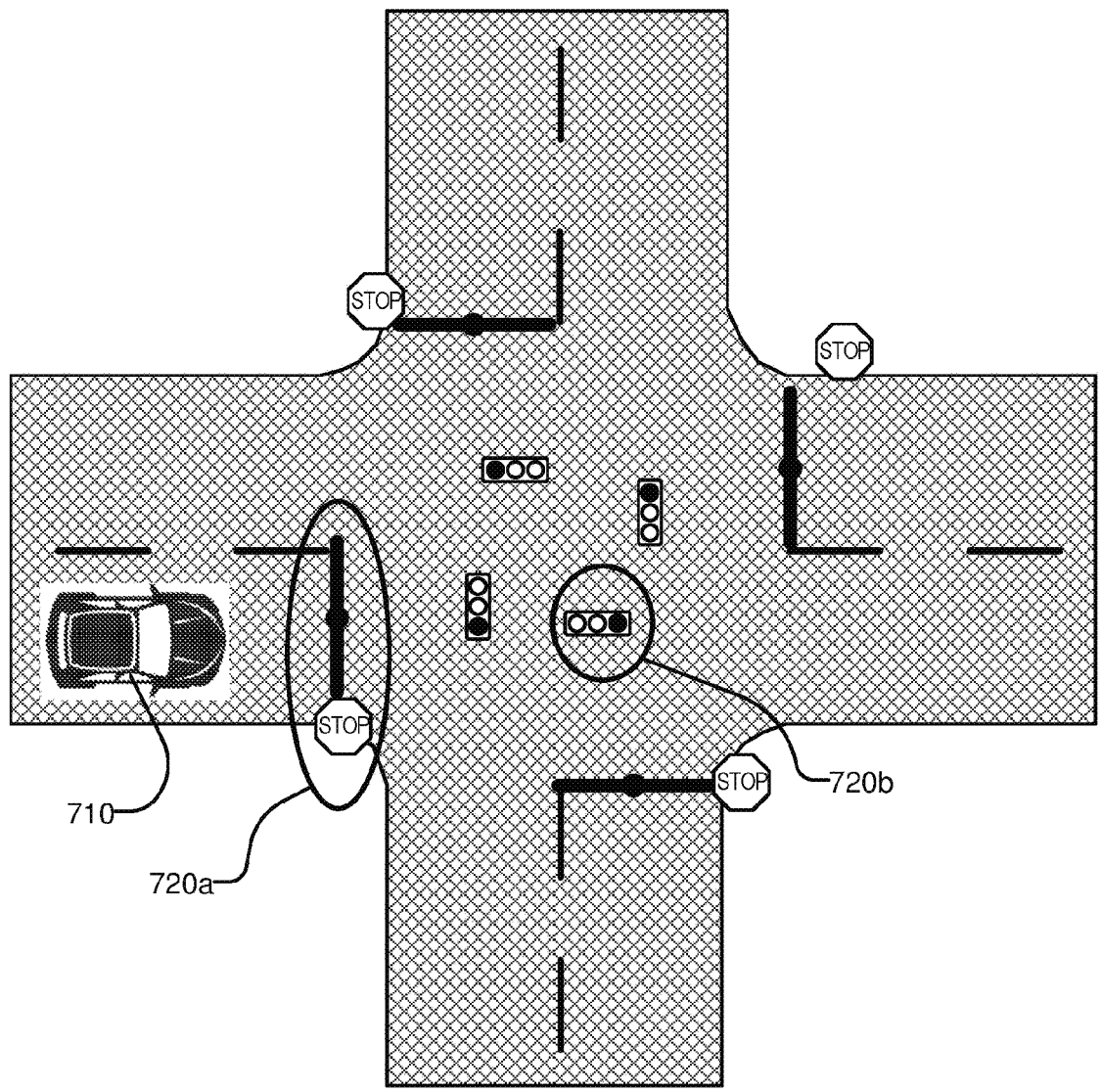
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
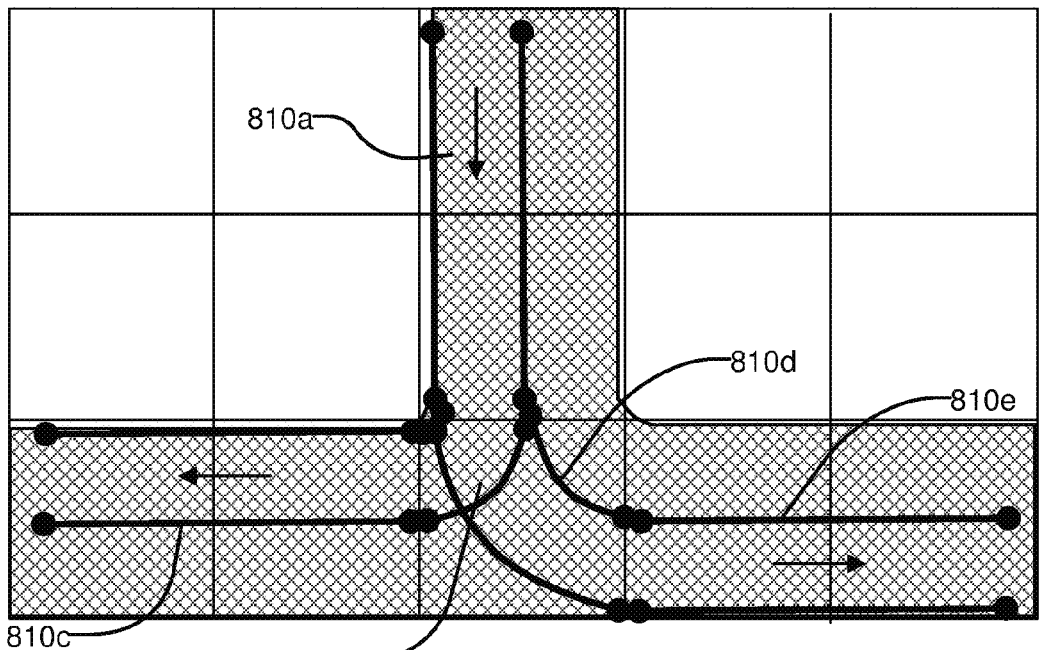
FIGS. 8A-8B illustrates example lane elements and relationships between lane elements in an HD map.
Figure 8B:
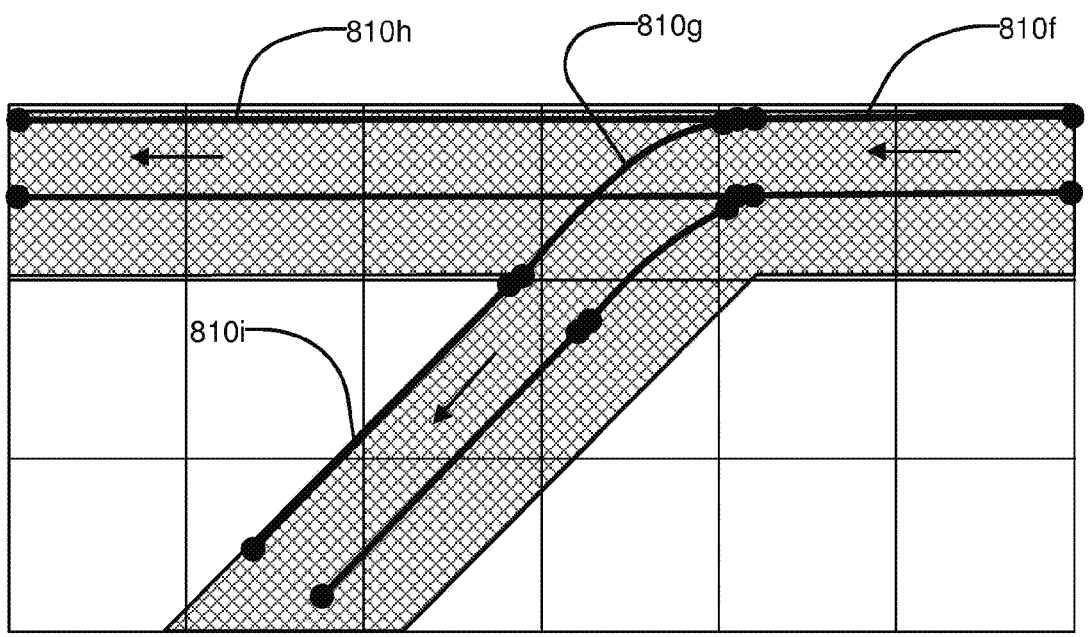

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Navigable Surface Boundary Implementation

Figure 9:
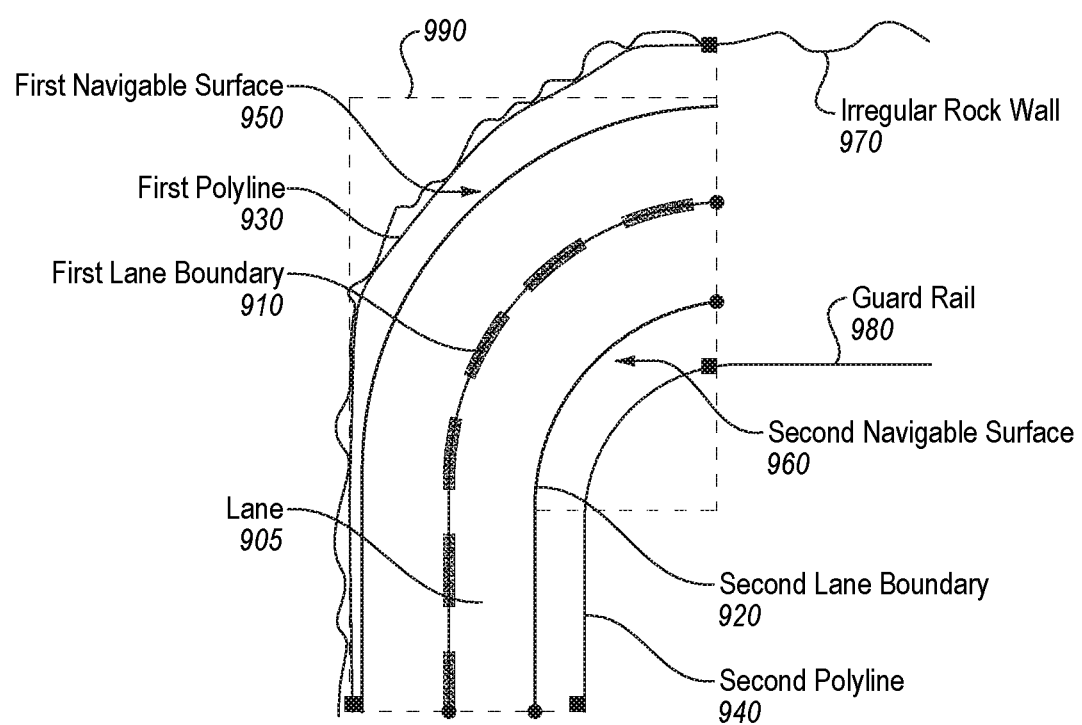
FIG. 9 illustrates an example representation of navigable surface boundaries in an HD map.

FIG. 9 illustrates an example representation of navigable surface boundaries in an HD map. In some embodiments, navigable surface boundaries may describe a physical area that lies beyond the boundary of a lane but within which the vehicle may safely navigate without damage to the vehicle. A given lane 905 may have two lane boundaries, namely, a first lane boundary 910 and a second lane boundary 920. Beyond each lane boundary and within a polyline representation is an area of navigable surface. More specifically, between the first lane boundary 910 and a first polyline 930 lies a first navigable surface 950 over which the autonomous vehicle can travel. Similarly, between the second lane boundary 920 and a second polyline 940 lies a second navigable surface 960 over which the autonomous vehicle can travel. In some embodiments, a navigable surface area may refer, for example, to a shoulder of a road, another lane adjacent to a lane, a sidewalk adjacent to a lane, or a stretch of unpaved land adjacent to a lane, or some combination thereof. In some embodiments, the first polyline 930 may be at least partially defined by a structure, such as the irregular rock wall 970. Similarly, in some embodiments, the second polyline 940 may be at least partially defined by another structure, such as the guard rail 980. In some embodiments, structures that may at least partially define a polyline may include, but are not limited to, features such as fences, safety barriers, posts, walls, curbs, ditches or draining depressions, hills, buildings, and trees. In some embodiments, a polyline may be defined by a rule or set of rules where there is no discernable structure that can be used to define the polyline (e.g., a rule that defines a polyline at a distance beyond the lane boundary).

Figure 10:
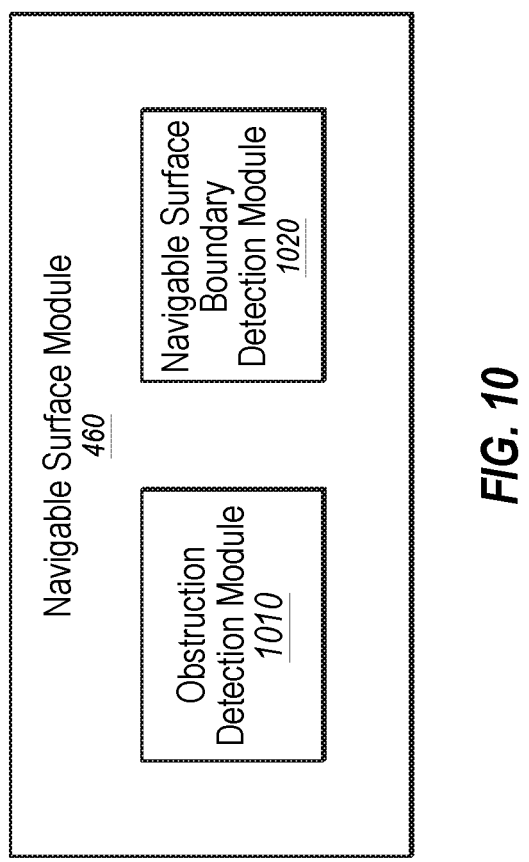
FIG. 10 illustrates an example of system architecture of a navigable surface module.

FIG. 10 illustrates an example of system architecture of the navigable surface module 460. In some embodiments, the navigable surface module 460 may generate representations of navigable surfaces within an HD map, and may utilize these navigable surfaces to maneuver the autonomous vehicle responsive to certain environmental conditions. The system architecture of the navigable surface module 460 may include an obstruction detection module 1030 and a navigable surface boundary detection module 1040. Some embodiments of the navigable surface module 460 may be configured to include more or fewer modules than shown in FIG. 10. Functionality indicated as being performed by a particular module may be implemented by other modules. In some embodiments, at least some of the modules of the navigable surface module 460 may be stored in the online HD map system 110.

The obstruction detection module 1030 may be configured to perform an image analysis to identify obstructions within a lane from a set of structures within an HD map. In some embodiments, structures may include, but are not limited to, features such as fences, safety barriers, posts, walls, curbs, ditches or draining depressions, hills, buildings, and trees. The images subject to image analysis may be captured by one or more stationary, positioned sensors or by sensors attached to other vehicles connected with the online HD map system 110. The image analysis process for determining if a structure is an obstruction may be performed as described below in reference to FIG. 12. Additionally, the image analysis may recognize and associate each structure with a type of surface, such as pavement, gravel, or dirt. In some embodiments, the obstruction detection module 1030 may identify obstructions dynamically over time such that identified obstructions may be dynamically updated.

From the identified obstructions, which may be dynamically updated over time, the navigable surface boundary detection module 1020 may generate a polyline representation of the navigable surface, which may also be dynamically updated based on any updates to the identified obstructions. The process for generating a polyline representation, representing the outer boundary of the navigable surface, may be performed as described below in reference to FIG. 13. Using the polyline representation, the vehicle computing system may make a determination as to whether or not to travel over the navigable surface. In some embodiments, the determination may account for a level of difficulty for a vehicle to travel over the navigable surface. Based on the determination, under specific conditions, the vehicle computing system may send control signals to the vehicle controls 130 of the autonomous vehicle to travel over the navigable surface. The process for implementing the navigable surface boundaries in the HD map may be performed as described below in reference to FIG. 14.

Figure 11:
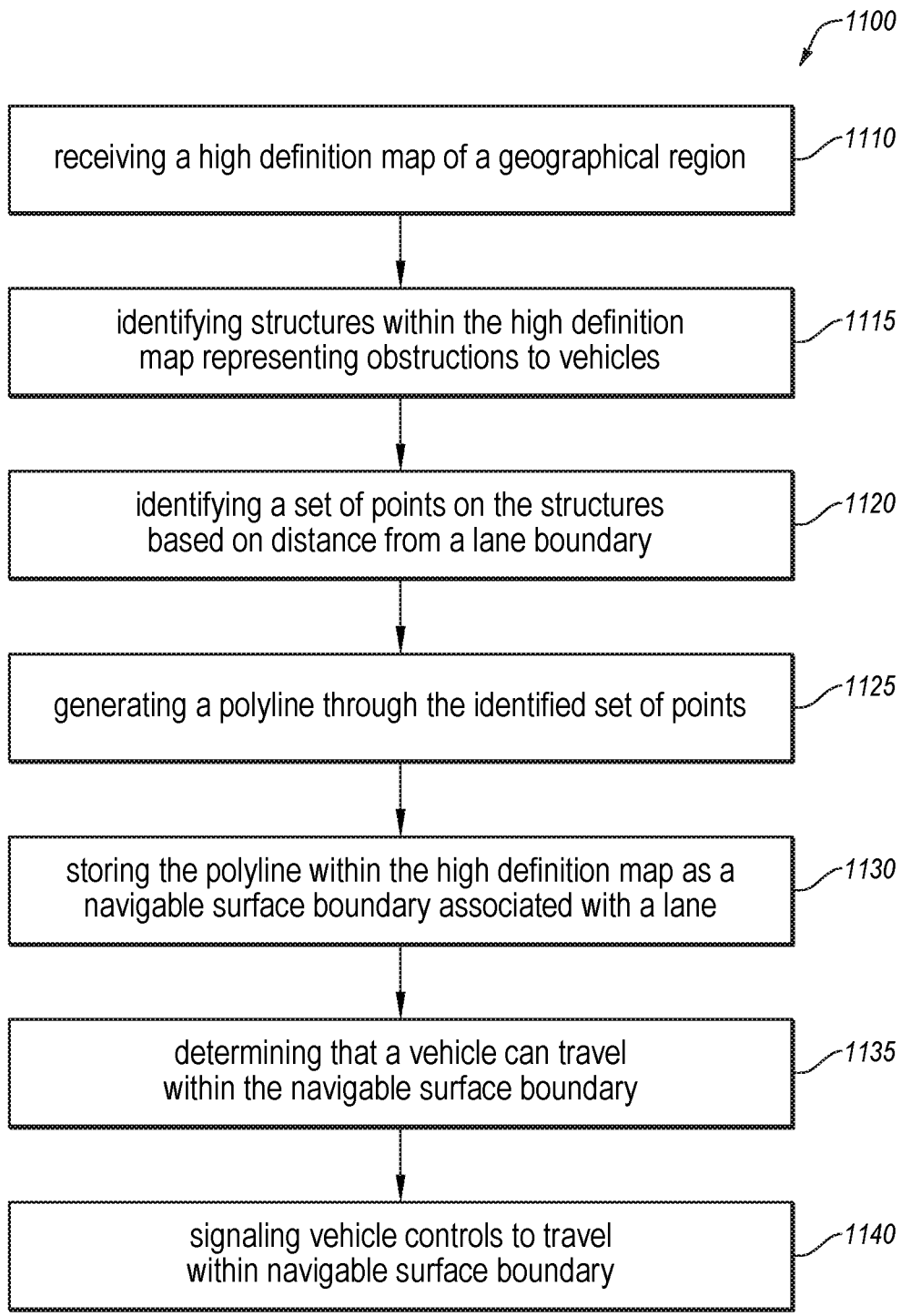
FIG. 11 illustrates a flow chart of an example method of generating navigable surface boundaries.

FIG. 11 illustrates a flow chart of an example method 1100 of generating navigable surface boundaries. In some embodiments, the method 1100 may be employed by the vehicle computing system 120 to generate and implement navigable surface boundaries in an HD map. The method 1100 may be performed by any suitable system, apparatus, or device. For example, one or more elements of the HD map system 100 of FIG. 1 may be configured to perform one or more of the operations of the method 1100. Additionally or alternatively, the computer system 1700 of FIG. 17 may be configured to perform one or more of the operations associated with the method 1100. Although illustrated with discrete blocks, the actions and operations associated with one or more of the blocks of the method 1100 may be divided into additional blocks, combined into fewer blocks, or eliminated, depending on the particular implementation.

The method 1100 may include, at action 1110, the vehicle computing system 120 receiving an HD map of a geographical region with 3D representations of objects within the geographical region. The method 1100 may include, at action 1110, from these 3D representations, the obstruction detection module 1010 identifying structures representing obstructions to vehicles within the HD map from the set of structures within the geographical region of the HD map. The method 1100 may include, at action 1120, for each of the structures identified as obstructions, the vehicle computing system 120 identifying a set of points on the structure based on their perpendicular distance from either the first lane boundary 910 or the second lane boundary 920. The method 1100 may include, at action 1125, the vehicle computing system 120 generating a polyline representing the navigable surface boundary through the previously identified points. The method 1100 may include, at action 1130, storing the polyline within the HD map as a representation of a navigable surface boundary for a specific lane. The method 1100 may include, at action 1135, for each of the stored polylines, the vehicle computing system 120 determining whether the autonomous vehicle can travel over the navigable surface. The method 1100 may include, at action 1140, based on that determination, the vehicle computing system 120 signaling the vehicle controls to travel within the navigable surface boundary or to continue traveling within the current lane.

Figure 12:
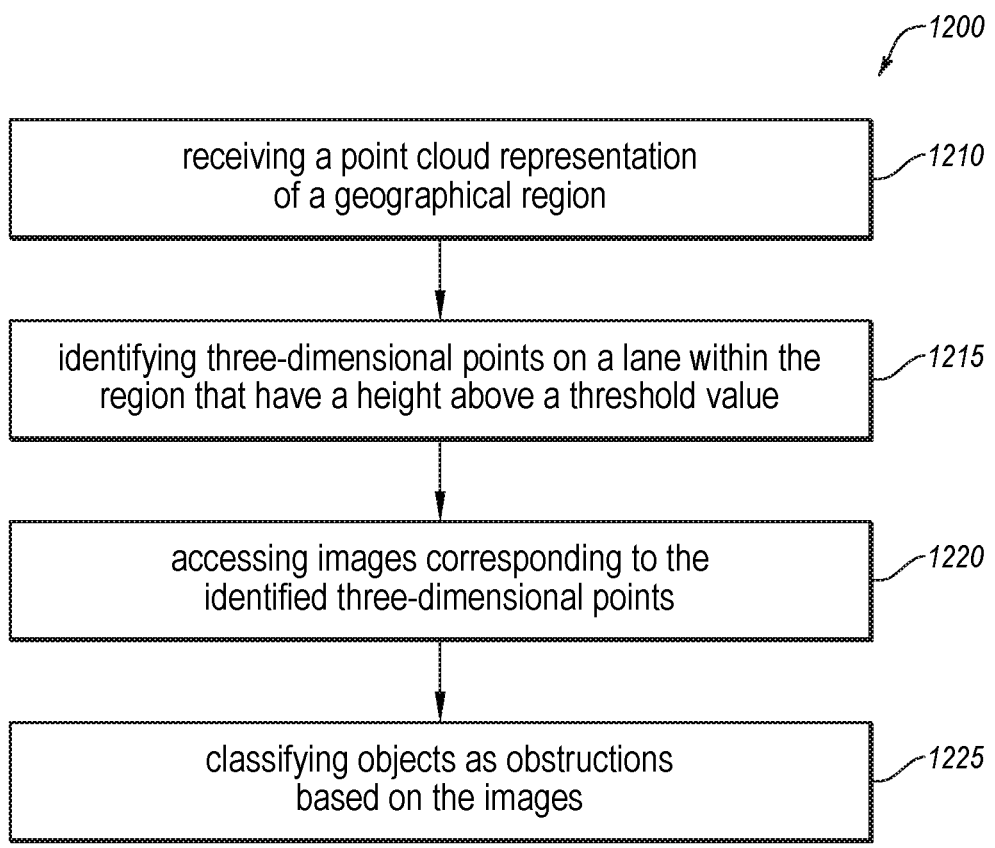
FIG. 12 illustrates a flow chart of an example method of obstruction detection.

FIG. 12 illustrates a flow chart of an example method 1200 of obstruction detection. In some embodiments, the method 1200 may be employed to accurately detect obstructions. The method 1200 may be performed by any suitable system, apparatus, or device. For example, one or more elements of the HD map system 100 of FIG. 1 may be configured to perform one or more of the operations of the method 1200. Additionally or alternatively, the computer system 1700 of FIG. 17 may be configured to perform one or more of the operations associated with the method 1200. Although illustrated with discrete blocks, the actions and operations associated with one or more of the blocks of the method 1200 may be divided into additional blocks, combined into fewer blocks, or eliminated, depending on the particular implementation.

The method 1200 may include, at action 1210, the obstruction detection module 1010 receiving a three-dimensional representation of the geographical region, for example, a point cloud representation of a geographical region. The method 1200 may include, at action 1215, the obstruction detection module 1010 identifying a set of points on the 3D representations of the structures at heights above a threshold height. In some embodiments, the threshold height is set manually by users of the autonomous vehicle. In other embodiments, the threshold height is determined based on the current surroundings of the autonomous vehicle. The method 1200 may include, at action 1220, from the identified points, the obstruction detection module 1010 accessing one or more captured images corresponding to the points on the structure. The method 1200 may include, at action 1225, the obstruction detection module 1010 classifying objects as obstructions based on these images. In some embodiments, a machine learning-based object recognition method may be used to classify structures into types of obstructions. In some embodiments, the machine learning-based object recognition may be trained using supervised learning by providing a labelled training data set comprising images and labels identifying the structures in the images.

Figure 13:
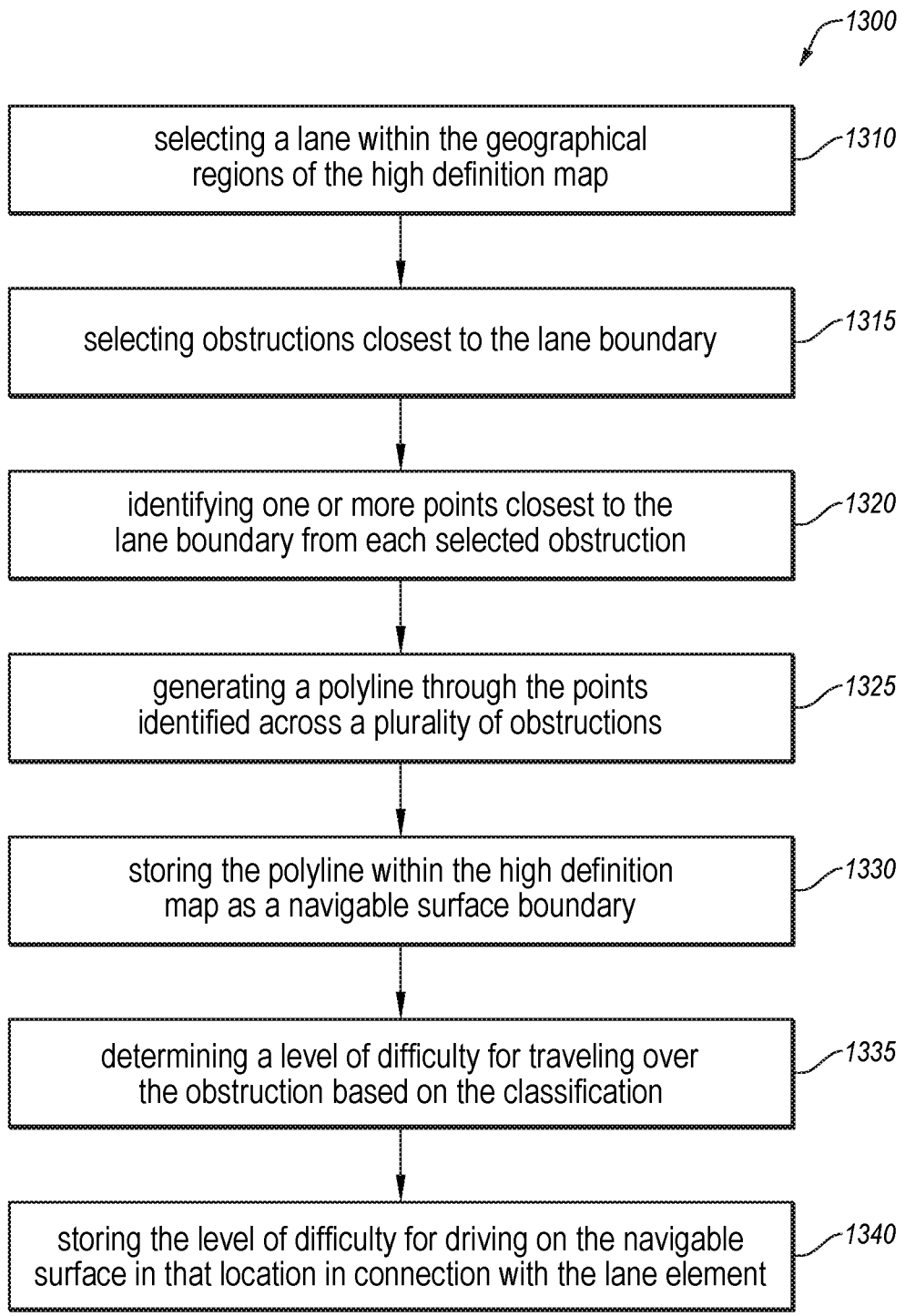
FIG. 13 illustrates a flow chart of an example method of determining navigable surface boundaries.

FIG. 13 illustrates a flow chart of an example method 1300 of determining navigable surface boundaries. In some embodiments, the method 1300 may be employed to generate a polyline representation of a navigable surface boundary. The method 1300 may be performed by any suitable system, apparatus, or device. For example, one or more elements of the HD map system 100 of FIG. 1 may be configured to perform one or more of the operations of the method 1300. Additionally or alternatively, the computer system 1700 of FIG. 17 may be configured to perform one or more of the operations associated with the method 1300. Although illustrated with discrete blocks, the actions and operations associated with one or more of the blocks of the method 1300 may be divided into additional blocks, combined into fewer blocks, or eliminated, depending on the particular implementation.

The method 1300 may include, at action 1310, the navigable surface boundary detection module 1020 selecting, from the geographical regions of the HD map, the lane on which the autonomous vehicle is currently traveling. The method 1300 may include, at action 1315, the navigable surface boundary detection module 1020 selecting one or more structures within the lane and determining the perpendicular distance between the lane boundary and the structure. If there are multiple structures encountered while travelling away from a lane boundary, the navigable surface boundary detection module 1020 may select the nearest structure to the lane boundary since that may be the structure a vehicle would most likely encounter if the vehicle drove off of the lane. The method 1300 may include, at action 1320, for each selected structure, the navigable surface boundary detection module 1020 identifying a point with the smallest perpendicular distance from the boundary. The method 1300 may include, at action 1325, the navigable surface boundary detection module 1020 generating a polyline through the identified points across a plurality of obstructions. The method 1300 may include, at action 1330, the navigable surface boundary detection module 1020 generating a polyline through the identified point and neighboring identified points from the remaining selected obstructions. The method 1300 may include, at action 1330, the navigable surface boundary detection module 1020 storing the polyline within the HD map as a navigable surface boundary. The method 1300 may include, at action 1335, at each point on the polyline, the navigable surface boundary detection module 1020 determining a level of difficulty score within the HD map describing the difficulty that the autonomous vehicle would experience traveling over the obstruction. In some embodiments, the level of difficulty may account for the make and model of the autonomous vehicle. In some embodiments, the level of difficulty may be associated with the type of navigable surface and the structures on the navigable surface boundary (e.g., the physical properties, geometric dimensions, type of obstruction, etc.). For example, a paved shoulder may be associated with a lower level of difficulty than a gravel shoulder. Additionally, a smooth slope as a structure may be less difficult to drive over compared to a curb, which may result in a higher level of difficulty being associated with the curb. Furthermore, the difficulty of driving over the curb may be determined based on the height of the curb. In some embodiments, the level of difficulty may also account for the risk of damage to the vehicle. For example, a sidewalk with a curb may have a higher level of difficulty than a sidewalk without a curb because the vehicle may be damaged by hitting the curb. Additionally, in determining the level of difficulty, the risk of damage may be balanced by alternative options, such as hitting an obstacle in the lane. The method 1300 may include, at action 1340, the navigable surface boundary detection module storing the level of difficulty within the HD map system at various points along the polyline.

Figure 14:
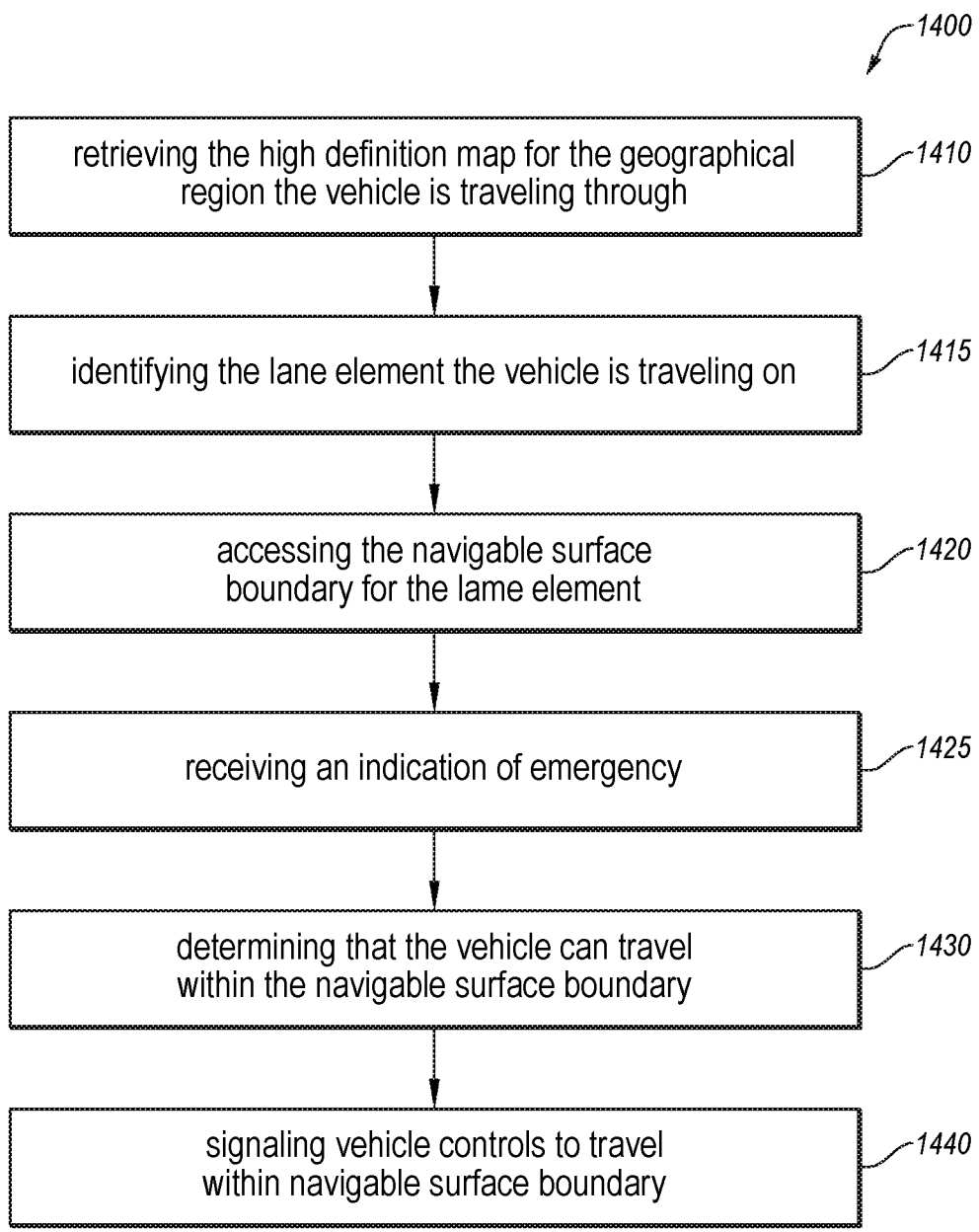
FIG. 14 illustrates a flow chart of an example method of implementing navigable surface boundaries in an HD map.

FIG. 14 illustrates a flow chart of an example method 1400 of implementing navigable surface boundaries in an HD map. The method 1400 may be performed by any suitable system, apparatus, or device. For example, one or more elements of the HD map system 100 of FIG. 1 may be configured to perform one or more of the operations of the method 1400. Additionally or alternatively, the computer system 1700 of FIG. 17 may be configured to perform one or more of the operations associated with the method 1400.

Although illustrated with discrete blocks, the actions and operations associated with one or more of the blocks of the method 1400 may be divided into additional blocks, combined into fewer blocks, or eliminated, depending on the particular implementation.

The method 1400 may include, at action 1410, the lane runtime processing module 290 retrieving the HD map for the geographical regions of the HD map. The method 1400 may include, at action 1415, the lane runtime processing module 290 identifying the lane element on which the autonomous vehicle is currently traveling. The method 1400 may include, at action 1420, for the identified lane element, the lane runtime processing module 290 accessing the navigable surface boundary. The method 1400 may include, at action 1425, in the event of an emergency, the lane runtime processing module 290 receiving an indication of emergency. An emergency may refer to an extenuating circumstance that may unexpectedly force the autonomous vehicle out of its lane such as, for example, another car swerving out of control, large debris blocking the lane, or a hole in the middle of the road. In some embodiments, the vehicle may detect an emergency by detecting the lane condition via the sensors of the vehicle and analyzing the image, for example, to detect an obstruction within the lane that prevents the vehicle from continuing to travel in the lane. The vehicle may then determine if the vehicle could change lanes to move to an adjacent lane. If the vehicle determines that the adjacent lane is blocked or if there is no adjacent lane, the vehicle may determine whether it is safe to drive on the navigable surface of the lane, if available. The method 1400 may include, at action 1430, after receiving the indication of emergency, the lane runtime processing module 290 may determine, based on the levels of difficulty stored within the points of the polyline, that the vehicle can safely travel over the navigable surface. The method 1400 may include, at action 1440, the lane runtime processing module 290 signaling the vehicle controls of the autonomous vehicle to move out of the current lane and travel within the navigable surface boundary. The vehicle sensors may then continue to monitor the lane conditions to determine whether it is safe to return to the lane from the navigable surface. If the vehicle computing system 120 determines that the lane conditions become safe, the vehicle computing system 120 may send control signals the to the vehicle controls 130, causing the vehicle to return to the lane associated with the navigable surface boundary. In some embodiments, the lane runtime processing module 290 may continuously monitor the levels of difficulty stored within the polylines and compare them with the severity of the emergency determined within the lane to determine whether it is safer to return to the lane.

Localization Based on Map

Figure 15:
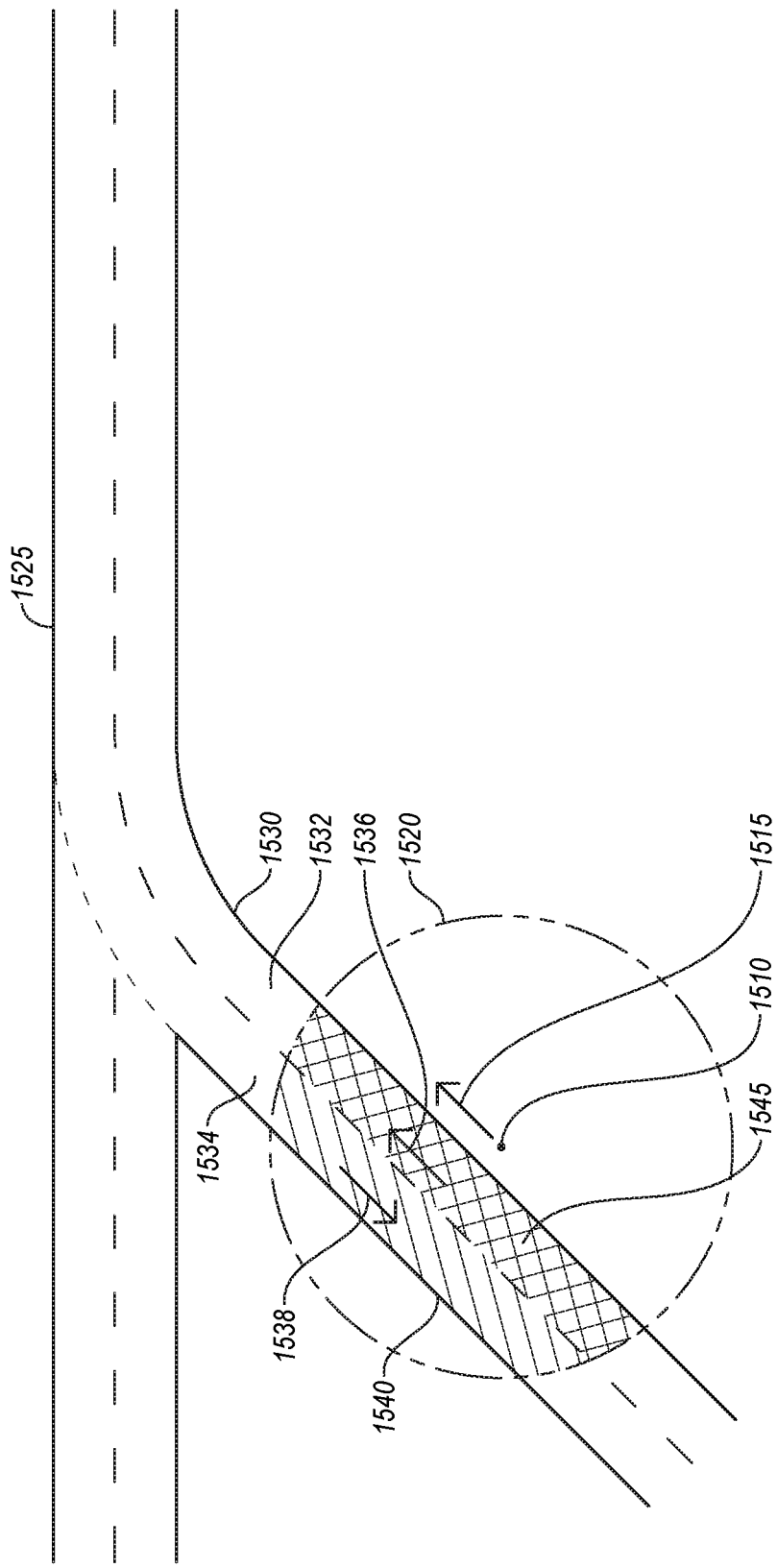
FIG. 15 illustrates an example search space used for localization.

FIG. 15 illustrates an example search space used for localization. As disclosed in FIG. 5, the approximate geographic location 1510 may represent an approximate geographic location of a vehicle (e.g., the vehicle 150a) based on an initial estimate, for example, based on GNSS. The direction 1515 may represent direction of travel of the vehicle. The region 1520 may represent a region within a threshold of the approximate geographic location 1510, for example, as a circle of a predetermined size of radius (e.g., 100 meters) around the approximate geographic location 1510. The road 1525 may represent a portion of a road. The road 1530 may represent a portion of another road, for example, a lane segment that is near the approximate geographic location 1510. The region 1540 may represent the intersection of the region 1520 and road 1530. The region 1540 may be used as the search space in an HD map for determining an accurate location of the vehicle, for example, either based on a grid-based search or a particle filter-based search.

In some embodiments, the search space in an HD map for determining an accurate location of the vehicle may be further narrowed from an entire road to one or more lanes of the road having a direction of travel that matches the direction of travel of the vehicle. For example, the road 1530 that represents the road nearest to the approximate geographic location 1510 of the vehicle may include a first lane 1532 and a second lane 1534. The first lane 1532 may have a direction of travel 1536 that matched the direction 1515 of travel of the vehicle. In contrast, the second lane 1534 may have a direction of travel 1538 that is opposite the direction 1515 of travel of the vehicle. Accordingly, the second lane 1534 can be eliminated from the search space, and the search space can be narrowed to the region 1545 which may represent the intersection of the region 1520 and the lane 1532 of the road nearest the approximate geographic location 1510 of the vehicle.

Figure 16:
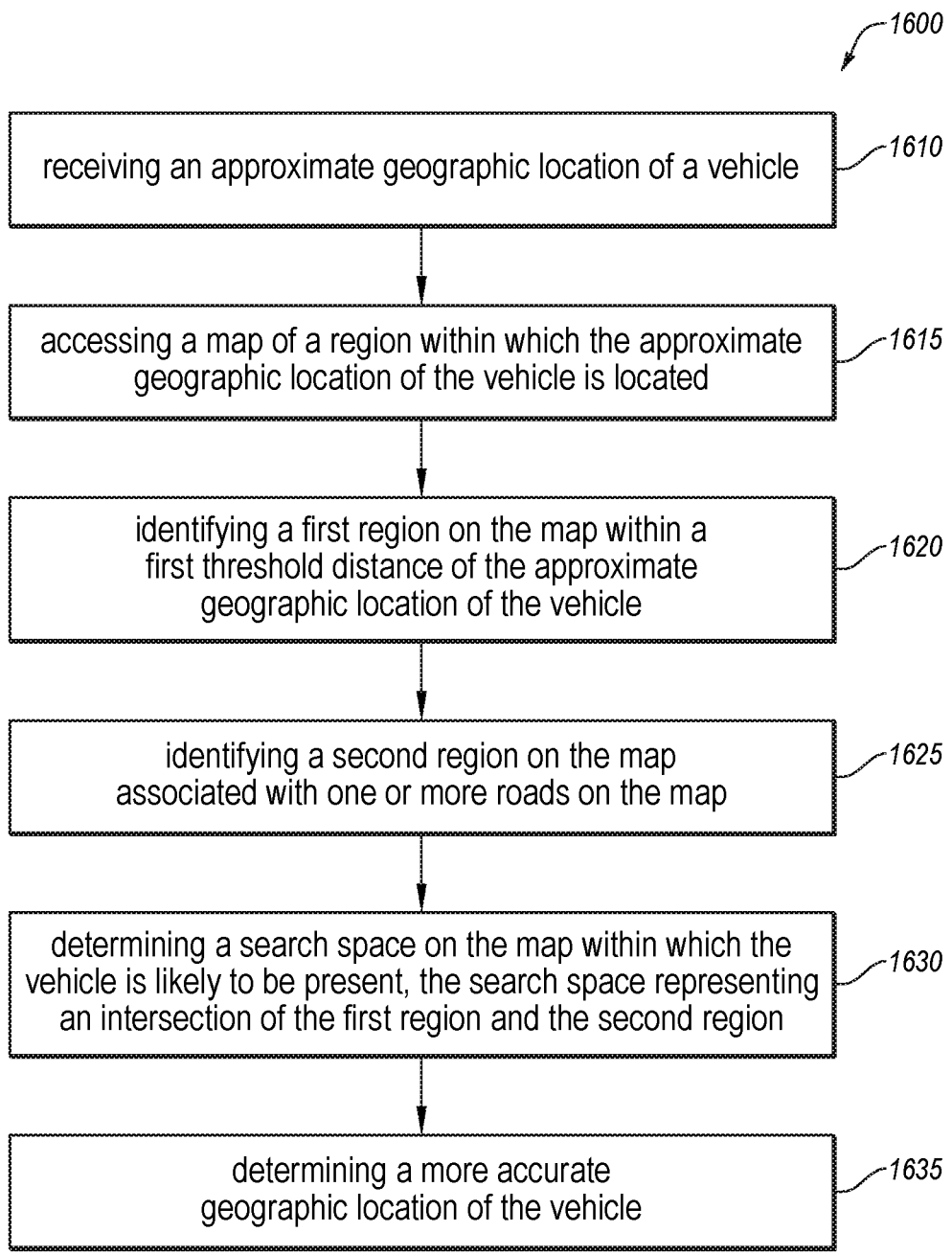
FIG. 16 illustrates a flowchart of an example method of using map-based constraints for determining vehicle state.

FIG. 16 illustrates a flowchart of an example method 1600 of using map-based constraints for determining vehicle state. The method 1600 may be performed by any suitable system, apparatus, or device. For example, one or more elements of the HD map system 100 of FIG. 1 may be configured to perform one or more of the operations of the method 1600. Additionally or alternatively, the computer system 1700 of FIG. 17 may be configured to perform one or more of the operations associated with the method 1600. Although illustrated with discrete blocks, the actions and operations associated with one or more of the blocks of the method 1600 may be divided into additional blocks, combined into fewer blocks, or eliminated, depending on the particular implementation.

The method 1600 may include, at action 1610, receiving an approximate geographic location of a vehicle. In some embodiments, the receiving of the approximate geographic location of the vehicle may include receiving a global navigation satellite system (GNSS)-based geographic location of the vehicle. In some embodiments, the receiving of the approximate geographic location of the vehicle may include receiving a location of the vehicle from an operator of the vehicle. For example, the localization module 295 of the vehicle computing system 120a may receive, at action 1610, an approximate geographic location 1510 of the vehicle 150a. The approximate geographic location 1510 of the vehicle 150a may be obtained using GNSS or from a manual entry from an operator of the vehicle 150a, for example.

The method 1600 may include, at action 1615, accessing a map of a region within which the approximate geographic location of the vehicle is located. In some embodiments, the map may include information about roads at least partially located within the region. In some embodiments, the map may describe roads within the region, for example, the locations of the lanes of the road, metadata describing the lanes, the direction in which vehicles are allowed to travel along the lane, whether the lane is right turn only or left turn only lane, etc. For example, the localization module 295 of the vehicle computing system 120a may access, at action 1615, an HD map from the HD map store 165 of the online HD map system 110. The HD map may be of a region within which the approximate geographic location 1510 of the vehicle 150a is located, and may include information about roads at least partially located in the region, such as the roads 1525 and 1530.

The method 1600 may include, at action 1620, identifying a first region on the map within a first threshold distance of the approximate geographic location of the vehicle. In some embodiments, the identifying of the first region may include identifying a circular region (or region with another shape) surrounding the approximate geographic location of the vehicle. For example, the localization module 295 of the vehicle computing system 120*a* may identify, at action 1620, the region 1520 on the HD map that is within a first threshold radius (e.g., 100 meters based on an accuracy of a GPSS location) around the approximate geographic location 1510 of the vehicle 150*a*.

In some embodiments, the action 1620 may further include, in response to determining that no roads are within the first threshold distance of the approximate geographic location of the vehicle, identifying the first region on the map within a second threshold distance of the approximate geographic location of the vehicle, the second threshold distance being greater than the first threshold distance. For example, the localization module 295 of the vehicle computing system 120*a* may identify, at action 1620, the region 1520 on the HD map that is within a second threshold radius (e.g., 150 meters based on increasing the first threshold radius by 50% due to no roads being within the first threshold radius) around the approximate geographic location 1510 of the vehicle 150*a*.

The method 1600 may include, at action 1625, identifying a second region on the map associated with one or more roads on the map. In some embodiments, the identifying of the second region, at action 1625, may include identifying navigable boundaries of the road on the map that is nearest to the approximate geographic location of the vehicle. For example, the localization module 295 of the vehicle computing system 120*a* may identify, at action 1625, the road 1530 on the HD map that represents the road on the HD map that is nearest to the approximate geographic location 1510 of the vehicle 150*a*, or may identify navigable boundaries of the road 1530.

In some embodiments, the identifying of the second region, at action 1625, may include identifying one or more roads that are at least partially within the first region, determining one or more perpendicular distances between the approximate geographic location of the vehicle and the one or more roads, and identifying a road of the one or more roads that is nearest to the approximate geographic location of the vehicle based on the one or more perpendicular distances. For example, the localization module 295 of the vehicle computing system 120*a* may identify the road 1530 by identifying one or more roads that are at least partially within the first region 1520, determining one or more perpendicular distances between the approximate geographic location 1510 of the vehicle 150*a* and the one or more roads, and identifying a road of the one or more roads that is nearest to the approximate geographic location 1510 of the vehicle 150*a* based on the one or more perpendicular distances.

In some embodiments, the identifying of the second region, at action 1625, may include including, in the second region, navigable boundaries of one or more lanes, having a direction of travel that matches a direction in which the vehicle is moving, of the road on the map that is nearest to the approximate geographic location of the vehicle, and excluding, from the second region, navigable boundaries of one or more lanes, having a direction of travel that is opposite of the direction in which the vehicle is moving, of the road on the map that is nearest to the approximate geographic location of the vehicle. For example, the localization module 295 of the vehicle computing system 120*a* may identify, at action 1625, the second region by determining the direction 1515 that the vehicle 150*a* is moving (e.g. using an IMU), and then including, in the second region, navigable boundaries of the lane 1532, having a direction of travel 1536 that matches a direction 1515 in which the vehicle 150*a* is moving, of the road 1530 on the HD map that is nearest to the approximate geographic location 1510 of the vehicle 150*a*, and excluding, from the second region, navigable boundaries of the lane 1534, having a direction of travel 1538 that is opposite of the direction 1515 in which the vehicle 150*a* is moving, of the road 1530 on the HD map that is nearest to the approximate geographic location 1510 of the vehicle 150*a*.

The method 1600 may include, at action 1630, determining a search space on the map within which the vehicle is likely to be present, the search space representing an intersection of the first region and the second region. For example, the localization module 295 of the vehicle computing system 120*a* may determine, at action 1630, a search space on the HD map within which the vehicle 150*a* is likely to be present. The search space may be a region 1540, which represents an intersection of the first region 1520 and the road 1530.

The method 1600 may include, at action 1635, determining a more accurate geographic location of the vehicle. In some embodiments, the determining of the more accurate geographic location may be accomplished by performing a search within the search space. In some embodiments, the performing of the search within the search space may enable the more accurate geographic location of the vehicle to be determined more quickly than could be determined by performing a search within the entire region of the map. For example, the localization module 295 of the vehicle computing system 120*a* may determine, at action 1635, a more accurate geographic location of the vehicle 150. This more accurate geographic location may be determined by searching the search space in the region 1540. This performing of the search within the search space (e.g., the region 1540) of the HD map may enable the more accurate geographic location of the vehicle 150*a* to be determined more quickly than could be determined by performing a search within the entire region of the HD map.

In some embodiments, the performing of the search within the search space, at action 1635, may include determining a set of particles using a particle-filter based localization method, each particle representing an estimated pose of the vehicle, and iteratively refining the set of particles using the particle-filter based localization method, the particles of the set after each iteration representing better estimated poses of the vehicle compared to the set of particles in each previous iteration. For example, the localization module 295 of the vehicle computing system 120*a* may perform, at action 1635, the search within the search space (e.g., the region 1540 or 1545) by determining a set of particles using a particle-filter based localization method, each particle representing an estimated pose of the vehicle 150*a*, and iteratively refining the set of particles using the particle-filter based localization method, the particles of the set after each iteration representing better estimated poses of the vehicle 150*a* compared to the set of particles in each previous iteration.

In some embodiments, the map of the region may include a first point cloud of the region, and the performing of the search within the search space, at action 1635, may include receiving, from a light detection and ranging sensor (LIDAR) mounted on the vehicle, a second point cloud comprising three dimensional points representing a sub-region around the vehicle as observed by the LIDAR, and matching the second point cloud with the first point cloud. For example, the localization module 295 of the vehicle computing system 120*a* may perform, at action 1635, the search within the search space (e.g., the region 1540 or 1545) by determining receiving, from a LIDAR mounted on the vehicle 150*a*, a second point cloud comprising three dimensional points representing a sub-region around the vehicle 150*a* as observed by the LIDAR, and matching the second point cloud with a first point cloud of the HD map.

Subsequent to the action 1635, the method 1600 may employ the more accurate geographic location of the vehicle 150*a* in gathering data to update the HD map store 165, and/or in navigating the vehicle based on the more accurate geographic location of the vehicle 150*a*. Further, the method 1600 may be employed repeatedly as the vehicle 150*a* navigates along a road. For example, the method 1600 may be employed with the vehicle 150*a* (or another non-autonomous vehicle) starts driving, and then may be employed repeatedly during the navigation of the vehicle 150*a* (or another non-autonomous vehicle). The vehicle 150*a* may navigate by sending control signals to controls of the vehicle 150*a*. The method 1600 may be employed by the vehicle computing system 120*a* of the vehicle 150*a* to reduce the search space of the HD map when determining the geographic location of the vehicle 150*a*, i.e., by limiting the search to places where a vehicle is expected to drive, for example, within navigable boundaries of the nearest road. In some embodiments, the method 1600 may be employed by the vehicle computing system 120*a* to discretize the search space into a plurality of discrete sub-regions. The vehicle computing system 120*a* may perform the search within the determined search space by identifying a sub-region in which the vehicle 150*a* has the highest likelihood of being present.

In some embodiments, an HD map may be employed to determine whether a localization of a vehicle is plausible. More particularly, after a vehicle has been localized, resulting in the determination of a geographic location and/or trajectory for the vehicle, the determined geographic location and/or trajectory may be compared against an HD map to determine whether the determined geographic location and/or trajectory is plausible. For example, where a localization of a vehicle results in a determined geographic location of the vehicle on the HD map that corresponds to a body of water (e.g., a lake, river, or ocean), a building, on any surface that is not a navigable surface, the HD map may be employed to determine that the localization of the vehicle is not plausible. In another example, where a localization of a vehicle results in a determined geographic location of the vehicle on the HD map that corresponds to a road, parking lot, or other navigable surface, the HD map may be employed to determine that the localization of the vehicle is plausible.

Localization Details

In some embodiments, a vehicle computing system may compute the pose of the vehicle using cameras and GPS/IMU. Some embodiments of a system may perform methods for camera-based odometry and localization and supports tools for analyzing localization results. For example, a system may use odometry and localization techniques, and integrate them with a Kalman filter.

Some embodiments may employ map constraints. An HD map may stores information that is used to improve the reliability of localization in 3D map data including: the 3D terrain around the vehicle; knowledge of the lanes and preferred driving paths; the nearest driving paths of the lane that can give a strong prior for changes in altitude, roll and pitch given a speed and time step; knowledge of speed controls (e.g., stop/yield lines, upcoming turns); and knowledge of the planned control relative to the map (i.e., which driving path and speed the AV is trying to maintain).

Some embodiments may employ constrained search. Given the map and that the vehicle is located somewhere on a known lane may greatly constrain the search problem. In such a situation, a system may use three free variables: latitude, longitude and yaw. Given a model of the vehicle and the map, the system may derive the other three variables: altitude, roll, and pitch. These constraints may reduce or minimize the search windows and make the solution more robust. The system may determine and use the position of the wheels and the altitude at those positions.

In some embodiments, a typical case may involve the vehicle is driving along the lane in a preferred driving path (e.g., the actual path could be more or less offset to some distance to the side of the preferred path). In such cases, the system may estimate the altitude, roll and pitch from interpolation/extrapolation from the nearby alignment poses. This may involve storing alignment poses in the map, looking them up, and interpolating them to infer the roll, pitch.

Some embodiments may employ map-knowledge integration. The system may add priors related to the trajectory of the lane driving path to the Kalman filter to help stability. The system may:

1. know the lane (lane element) and recommended driving path for the lane.
2. know the previous estimated driving path
3. extrapolate the likely next step given the previous driving path and its relation to the current recommended driving path, and use this as an expectation for the any extrapolations.
   a. e.g., if the vehicle is driving on a straight lane and the vehicle's past history is driving straight, the vehicle computing system may expect the vehicle to continue straight.
      i. this may generally work until the vehicle turns, but in an automated vehicle, this may be known ahead of time.
   b. for forks, the system can either attempt to make a best guess for which driving path will be followed, or drop the expectation. (In a real self-driving use case, the desired driving path may be used as an expectation input to the localizer KF).

In some embodiments, the system may use the "intended driving path" in the localization algorithm. The vehicle may not be able to follow the path exactly, but may indicate that the vehicle is trying to stay along the path (and temporally estimate the offset from the input path). This is similar to uncertainty in AV control when aiming to stay on a specific path at a specific speed. The vehicle computing system may use the intended driving path to narrow the search space for determining the location of the vehicle, for example, by restricting the search space to lanes that are in the direction of the intended driving path and help the vehicle to navigate along the intended driving path. Accordingly, portions of the road that do not help navigate along the intended driving path may be excluded or given less weight, such as, for example, lanes going in the opposite direction, lanes that lead to a different direction (e.g., if the intended driving path is going straight. Lanes excluded (or given less weight) may include left turn lanes, right turn lanes, and lanes that exit to other side street that the vehicle does not intend to go through. The vehicle computing system may thereby narrow the search space significantly.

Particle Filter for Vehicle Localization

As noted above, in some embodiments, the vehicle computing system 120a may perform the search within the determined search space using a particle filter-based approach. The particle filter-based approach may determine a set of particles, with each particle representing a pose of the vehicle 150a. The vehicle computing system 120a may then iteratively refine the set of particles after each iteration, so that the particles of the set represent better estimates of pose of the vehicle 150a compared to the set of particles in a previous iteration.

Also, as noted above, in some embodiments, the vehicle computing system determines the vehicle pose of the vehicle by receiving sensor data from sensors of the vehicle and matching the received sensor data with the data of the map of the region. For example, the map of the region comprises a first point cloud P1 of the region, and the vehicle computing system receives, from a lidar mounted on the vehicle, a second point cloud P2 comprising three dimensional points representing region around the vehicle as observed by the lidar. The vehicle computing system determines the accurate vehicle pose of the vehicle by matching the second point cloud with the first point cloud.

In some embodiments, a vehicle performs localization using a particle filter-based localization method. The particle filter may serve as an independent localization method (distinct from an ICP based method) that can be made lightweight enough to operate constantly during vehicle motion. By varying the number of particles for pose estimation and the number of correspondence points used for scan-matching, the system can tailor the runtime requirements necessary to query the particle filter localizer. Since the number of particles may be a function of the localization query frequency, the system can perform (coarse) vehicle localization at a target frequency (e.g. every 500 ms) by limiting the number of particles and points used for evaluation. This customization may make the particle filter suitable for constant vehicle localization that operates in the background of other localization operations, and serves as an independent estimate in addition to other localization techniques.

The vehicle computing system may perform localization, or determining the pose of a vehicle (its position and orientation) with respect to a given reference map. In some embodiments, the reference map may include a 3D point cloud and the sensor data measurement used for determining vehicle pose may be a 3D LIDAR scan. If both the sensor measurement and reference map are 3D point clouds, the vehicle computing system may perform localization based on scan-matching. The vehicle computing system may perform point cloud registration by computing the optimal rigid-body transformation that aligns the sensor measurement with the reference map.

In some embodiments, the vehicle computing system may perform localization using ICP-based scan-matching. ICP may involve the initial pose estimate to be near the actual pose of the vehicle. As a result, finding an initial pose that is substantially close to the true pose may be a significant factor in the success of this algorithm.

In some embodiments, the vehicle computing system may determine a good initial pose estimate for ICP by discretizing the pose variable space (x, y, z translation, yaw, pitch, roll rotation) and performing a grid search over this discretized space. Each pose hypothesis may be used to initialize one iteration of ICP, and only the pose that minimizes the ICP error metric may be evaluated further for the resulting rigid-body transformation. If computing this rigid-body transformation is successful, then the vehicle computing system may determine that it has estimated the vehicle localization within the reference map.

In some embodiments, the vehicle computing system may perform a particle filter-based localization method. The particle filter-based localization method may serve as an additional and independent estimate that can be customized to operate at the target frequency while the vehicle is in motion. Each particle may represent a pose hypothesis, and by leveraging an appropriate number of particles the system may sample the pose distribution without explicitly discretizing the pose (translation and rotation) space. Each pose hypothesis may be evaluated using a nearest-point computation for a specified number of points within the measurement function. Thus, the vehicle computing system may vary the number of hypotheses and the number of points used for evaluation in order to meet the time and computation resource limitations required for localization.

In some embodiments, trajectory prediction may be employed. The particle filter may be used to forecast the vehicle trajectory based on the current state (e.g., pose, velocity, acceleration, etc.). In some embodiments, a particle filter-based localization method may be performed that can handle high-frequency queries (e.g. every 500 ms), thus enabling a relatively constant vehicle localization technique. The particle filter localization method may serve as an additional and independent estimate that can be customized to operate at the target frequency while the vehicle is in motion. Each particle may represent a pose hypothesis, and by leveraging an appropriate number of particles the vehicle computing system can sample the pose distribution without explicitly discretizing the pose space (translation and rotation). Measuring the likelihood of each particle pose hypothesis may be done by applying the pose to the sensor measurement (i.e. the source point cloud) and using the reference map KD tree to compute the resulting nearest point distance. Furthermore, only a subset of the points in the sensor measurement point cloud may be transformed to evaluate the likelihood of a pose estimate.

Propagating each particle through the measurement likelihood function may allow the vehicle computing system to assign a weight to each particle which reflects the relative importance of the particle. The assigned weight may represent the likelihood of the particle pose occurring in the pose distribution (which the vehicle computing system is trying to approximate). This interpretation of the particle weight may not always hold since the vehicle computing system may be using nearest-point distance for evaluation and not necessarily comparing the distance of points that correspond to each other in physical reality.

After each particle is evaluated with the nearest-point measurement likelihood function, the vehicle computing system may resample the particles to construct a new population of particles. The particles may be sampled with replacement to construct the next generation population, and the likelihood of a particle being sampled may be proportional to its weight. Thus, the vehicle computing system may copy particles with relatively high weight multiple times into the new population, and particles with relatively low weight may have a lower likelihood of appearing in the resampled population at all. Resampling may prevent particle degeneracy, the high-variance situation where only a few particles have a high weight while the rest have a trivially small weight. The bottleneck in this particle filter approach may be evaluating a pose hypothesis with a nearest point-lookup in the reference map KD tree. This query time may limit the number of particles available (and the number of points used for evaluation) in order to sustain a target localization frequency.

Some embodiments may employ generating pose hypotheses. At each localization instance, particles may primarily be sampled in the direction/orientation of the vehicle's motion. For example, if a vehicle is moving in the +x-direction then particles may have relatively high variance in the x-component of the pose, but low variance in the other pose components.

Some embodiments may employ a measurement function, such as nearest point distance using reference KD tree. After a pose is applied to some subset of the points in the sensor measurement, the KD tree may be used to find the nearest neighbor in the reference map to each transformed point. The weight assigned to a particle may be inversely proportional to the squared nearest-point distance. A particle pose hypothesis may be assigned a relatively high weight even though the pose is completely wrong. This may happen when the subset of points transformed coincidently fall somewhere near points in the reference map that are not true correspondences. This may be ameliorated by selecting evaluation points that sufficiently sample the underlying geometric structure of the sensor measurement point cloud.

Some embodiments may employ a sample size. Evaluating a pose hypothesis does not need to be done on every point within the sensor measurement. A significant number of points may be used for pose evaluation. Ideally, the number of points used for evaluation should be relatively small for very unlikely pose hypotheses, and more points can be added once the candidate population size has been narrowed down.

Some embodiments may employ a preemptive RANSAC. This technique may be used to quickly identify and remove unlikely pose hypotheses from the particle population. This may be a hierarchical approach that selects a specified number of hypotheses at each level that will survive for further evaluation. It starts by evaluating a fraction of hypothesis on a select number of (random) points, and removing the hypotheses that are unlikely (i.e. those which are assigned low weight). At each subsequent level, more points may be used for evaluation, and less hypotheses may be selected for survival.

Some embodiments may employ outliers. The vehicle computing system may remove vehicles (and other objects present in the sensor measurement but not the reference map) from consideration. The vehicle computing system may aim to avoid the situation where too many outlier points are used to evaluate a pose hypothesis.

Bootstrapping Via Particle Filter

Relocalization is a common problem in mobile robotics in which a robot is given a map and a large bound on its pose (~50 m) and must determine its pose relative to the map. Some embodiments perform bootstrapping, or ICP-based relocalization, in which ICP is used to align the vehicle's LiDAR scan to the correct pose in the map. This method may perform discretization of the translational and rotational degrees of freedom and perform a grid-search for pose estimates to initialize ICP.

Some embodiments include a particle filter-based process that probabilistically tests a large number of candidate poses using inexpensive per-point queries. By using only a subset of the source point cloud to determine a pose candidate's likelihood, the vehicle computing system avoids a full rigid-body point cloud optimization to test the suitability of a pose estimate. This reduction in computation allows the vehicle computing system to search many candidate poses without requiring a grid-search over the discretized pose space. By simultaneously considering a large number of poses and performing inexpensive operations to measure the likelihood of each pose estimate, the vehicle computing system can quickly converge to the correct pose.

Localization is an essential task in mobile robotics (including autonomous vehicles) where a robot is given a map of its environment and it must estimate its pose relative to this map. Relocalization is a subset of the general localization problem where the robot has a very large bound on the location of its pose. Relocalization may be necessary in situations such as localization system failure and sensor malfunction.

An autonomous vehicle can localize itself within its environment by taking the LiDAR scan of its surroundings and matching it against its map of the environment. This requires estimating the pose of the point cloud scan to register it against a target point cloud in the map. ICP may require an accurate estimate of the initial pose in order to converge to the correct alignment. Since this estimate may be much smaller than the relocalization bound, a gridsearch may be done to compute initial pose estimates (the x and y components of the pose translation and yaw component of the pose rotation may be discretized), and the quality may be evaluated by running a single iteration of ICP.

Rather than executing a gridsearch to initialize an iteration of ICP, the vehicle computing system may use a probabilistic approach to the problem and may use many hypotheses (particles) that use an inexpensive operation (e.g., point-to nearest point distance using KD tree) to quantify the likelihood of a particle containing an accurate pose.

A high volume of particles may allow the vehicle computing system to simultaneously test a large number of hypotheses (with each hypothesis corresponding to a pose). This is in contrast to ICP-based gridsearch, where only a small number (~40) of distinct hypotheses can be tested in a reasonable amount of time. The motivation for the particle filter approach may be to relocalize faster than a gridsearch-based bootstrapping method.

In an example illustration of a particle filter-based process for relocalization, a particle may consist of a point within a source point cloud and a pose with which to transform it. Once a point is transformed, the point-to-nearest point distance may be computed between this point and the target point cloud. The transformed particles may be color coded (or shaded differently) to indicate their resulting weights after transformation. The particles with higher weight have a higher likelihood of reproducing during the resampling phase, which results in other source point cloud points using the same pose hypothesis for transformation. Particles that are assigned a low weight have a smaller likelihood of reproducing, and thus it is more likely that the corresponding pose will not survive within the particle population after several generations.

Some embodiments perform efficient and fast relocalization within a map given a large search radius. Some embodiments localize faster than grid-search and random search based bootstrapping methods. some embodiments can also be used to perform real-time localization.

The vehicle computing system may perform a particle filter-based process for localization by iteratively sampling a sequence of particles from a proposal distribution and assigning weights to each particle based on the fidelity with which it matches the target posterior distribution (which is typically unknown). This probability distribution may characterize the pose of a given source point cloud within a target point cloud map. A particle may represent a point within the source point cloud and a candidate pose with which to transform it.

In some embodiments, this method may leverage a high volume of particles (though, currently only ~1e3) and performs cheap nearest neighbor computations to quantify the likelihood of each particle reflecting the correct pose. Each particle may be assigned a weight that is updated at each iteration of the algorithm to reflect the relative importance of the particle in modeling the posterior of the pose. Via a process akin to natural selection, particles that most accurately approximate the target posterior distribution will have the highest weights at the termination of the algorithm.

The weight of each particle may be determined by computing the point-to-nearest point distance of the transformed source point with respect to the target point cloud map. The method may include a point-to-nearest point query for each particle, but the system may use the result to test multiple pose hypotheses in a single iteration. One advantage of using a high volume of particles may be that several pose hypotheses can be tested using the relatively cheap point-to-nearest point computation. For comparison, a single iteration of ICP may require many nearest point queries and solving a linear system of equations to compute a rigid body transform. It may be beneficial to maximize the hypotheses (particle volume) and minimize the experimental time/cost (inexpensive measurement function).

The particle filtering-based process for localization may be performed according to the following algorithm:
Generate M particles initialized with random pose and source point cloud point
Until convergence or max iteration:
Prediction: for each particle i=1, . . . , M
Switch point in source point cloud and perturb pose (with some small probability)
Apply new pose to point
Update weight according distance from nearest point in the target map.
Update: for each particle i=1, . . . , M
Resample particles by likelihood proportional to weight.
Compute new weighted pose average (convergence criteria).

The prediction step of the algorithm may include applying the pose candidate to the point component of the particle. The vehicle computing system may perform the update step by updating particle weights according to a measurement function: the point-to-nearest point distance from the transformed particle point and the target map. In some embodiments, the weight update function may be:

$$w^i_t \leftarrow n \, \text{Exp}\{-0.5\|x^i_t - y^i_t\|^2\}$$

where (n is the Gaussian normalization constant). Typically, the exponent includes the covariance of the measurement function: $n \, \text{Exp}\{-0.5 x^T \Sigma^{-1} x\}$. A simplified implementation may use $\Sigma=1$.

In some embodiments, each iteration of the particle filter-based localization may propagate each particle through system dynamics, measuring the particle success, and updating the weights accordingly. This pipeline may translate to applying a particle's pose to its point (which is a member of the source point cloud) and measuring the point-to-nearest point distance between this (transformed) point and the closest point in the target point cloud (the map). Computing the nearest point within the target point cloud may be done using a KD Tree.

As described above, a particle may represent a point within the source point cloud and a pose with which to transform this point. This algorithm may be stochastic in that a particle's point and pose may be randomly generated and randomly changed/perturbed throughout the algorithm. In some embodiments, a particle's point (which is a point within the source point cloud) may be changed more frequently, whereas a particle's pose may be perturbed less frequently. The reason for not changing the point during each iteration with a probability of 1 is to provide for some chance of particle survival in the event that its pose is actually accurate for most points in the point cloud, but by chance its "offspring" do not have a high likelihood given this pose. This can happen in the event of noisy point clouds with outliers. The reason for perturbing the particle pose with some (small) probability is to inject noise into the system to prevent convergence to a poor alignment. Increasing the perturbation frequency may improve the results. The drawback of perturbing the pose too frequently may be slower convergence.

Particle filter-based re-localization may be tested in a synthetic scene with a corridor-like (road) structure and several random planes. The vehicle computing system may compute the correct pose that aligns the LIDAR scan with the point cloud map of the scene. Since the locations of points within the map are known, this effectively localizes the vehicle within the map. The vehicle LIDAR scan may be referred to as the source point cloud, and the point cloud map of the environment may be referred to as the target point cloud.

In some embodiments, when performing alignment within synthetic scene geometry with road and several random planes, the vehicle may be given a positive velocity in the x-direction and a nonzero angular velocity. The particle filter algorithm may compute the pose that aligns the initial source point cloud with the target map. The result may be the transformed source point cloud. In some embodiments, the vehicle velocity may be (10, 5, 0) m/s, and angular velocity may be 0.5 rad/sec. 500 particles may be used for 3000 iterations. Pose candidates may be constrained to the following ranges: X-range=(0,30), Y-range=(0,30), Z-range=(−1,3), yaw=(−45,45).

In some embodiments, with an initial source point cloud, and with a source transformed by pose computed via particle filter, a pose may be the result of increasing the frequency with which the particle poses are perturbed prior to the prediction step of the algorithm. Increasing the probability with which a pose is perturbed can help prevent converging to a poor pose, but it might come at the cost of increased number of iterations.

Computer System Architecture

Figure 17:
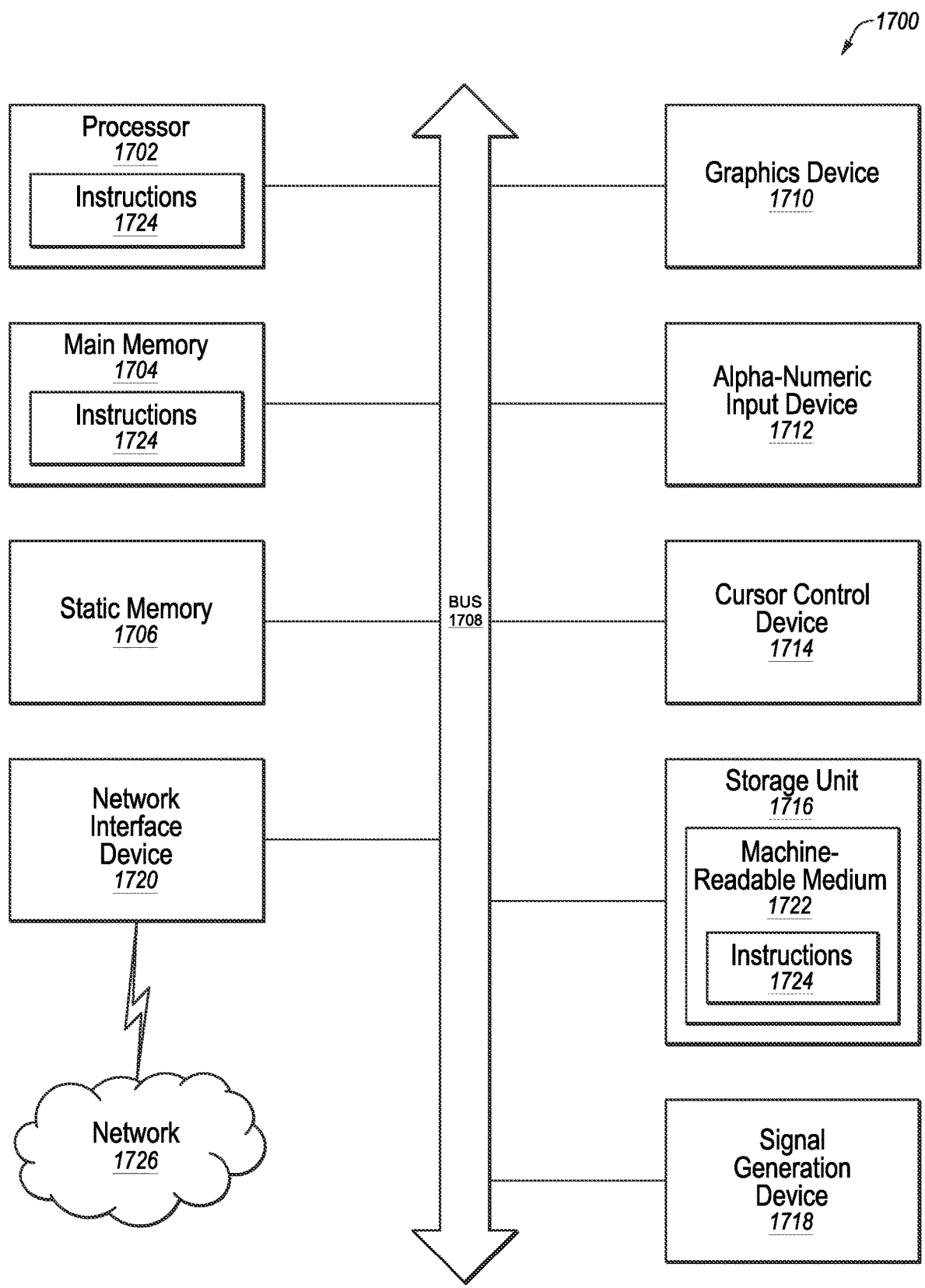
FIG. 17 illustrates an example embodiment of a computing machine that can read instructions from a machine-readable medium and execute the instructions in a processor or controller.

FIG. 17 is a block diagram illustrating components of an example computer system able to read instructions from a machine-readable medium and execute them in a processor (or controller). Specifically, FIG. 17 shows a diagrammatic representation of a machine in the example form of a computer system 1700 within which instructions 1724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1724 (sequential or otherwise) that specify actions to be taken by that machine. Further, while only a single machine is illustrated, the term "machine" shall also be taken to include any collection of machines that individually or jointly execute instructions 1724 to perform any one or more of the methodologies discussed herein.

The example computer system 1700 may be part of or may be any applicable system described in the present disclosure. For example, the online HD map system 110 and/or the vehicle computing systems 120 described above may comprise the computer system 1700 or one or more portions of the computer system 1700. Further, different implementations of the computer system 1700 may include more or fewer components than those described herein. For example, a particular computer system 1700 may not include one or more of the elements described herein and/or may include one or more elements that are not explicitly discussed.

The example computer system 1700 includes a processor 1702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1704, and a static memory 1706, which are configured to communicate with each other via a bus 1708. The computer system 1700 may further include graphics display unit 1710 (e.g., a plasma display panel (PDP), a liquid crystal display (LCD), a projector, or a cathode ray tube (CRT)). The computer system 1700 may also include alphanumeric input device 1712 (e.g., a keyboard), a cursor control device 1714 (e.g., a mouse, a trackball, a joystick, a motion sensor, or other pointing instrument), a storage unit 1716, a signal generation device 1718 (e.g., a speaker), and a network interface device 1720, which also are configured to communicate via the bus 1708.

The storage unit 1716 includes a machine-readable medium 1722 on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution thereof by the computer system 1700, the main memory 1704 and the processor 1702 also constituting machine-readable media. The instructions 1724 (e.g., software) may be transmitted or received over a network 1726 via the network interface device 1720.

While machine-readable medium 1722 is shown in an example embodiment to be a single medium, the term "machine-readable medium" should be taken to include a single medium or multiple media (e.g., a centralized or distributed database, or associated caches and servers) able to store instructions (e.g., instructions 1724). The term "machine-readable medium" shall also be taken to include any medium that is capable of storing instructions (e.g., instructions 1724) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    identifying a region within a map based at least on the region corresponding to an area that is within a threshold distance from a determined location of a vehicle;
    identifying a road associated with the map that includes at least a portion located within the region, the identifying of the road being based at least on one or more navigable boundaries corresponding to the road, the identifying of the one or more navigable boundaries being based at least on one or more polylines that are at least partially defined based at least on two or more structures;
    determining a search space within the map representing an intersection of the region and the road such that the search space is limited to a segment of the road;
    performing a localization of the vehicle based at least on the search space, wherein the localization is a particle-filter based localization method that includes determining a plurality of estimated poses that are limited to locations within the search space and in which one or more individual particles used in the particle-filter based localization method represent a respective estimated pose of the estimated poses, at least one of the particles and corresponding poses being evaluated using a nearest-point computation and being assigned a weight corresponding to distance of the nearest-point computation; and
    causing performance of one or more autonomous navigation control operations by the vehicle based at least on the localization.

2. The method of claim 1, wherein the determined location includes a global navigation satellite system (GNSS)-based geographic location of the vehicle.

3. The method of claim 2, wherein the threshold distance is based at least on an accuracy of the GNSS-based geographic location of the vehicle.

4. The method of claim 1, wherein the determined location is based at least on an input provided via a user interface.

5. The method of claim 1, wherein the identifying of the region further comprises identifying, based at least on the threshold distance, a defined region surrounding the determined location of the vehicle.

6. The method of claim 1, wherein the identifying of the road comprises:
    determining one or more perpendicular distances between the determined location of the vehicle and one or more roads; and
    identifying the road from the one or more roads as being nearest to the determined location of the vehicle based at least on the one or more perpendicular distances.

7. The method of claim 6, wherein the determining of the search space comprises:
    including, in the search space, first navigable boundaries of one or more first lanes of the road, wherein the one or more first lanes correspond to a direction of travel that matches a direction in which the vehicle is moving; and excluding, from the search space, second navigable boundaries of one or more second lanes of the road, wherein the one or more second lanes correspond to a direction of travel that is opposite of the direction in which the vehicle is moving.

8. The method of claim 7, further comprising determining one or more of: an altitude, a roll, or a pitch of the vehicle based at least on the first navigable boundaries of the one or more first lanes having the direction of travel that matches the direction in which the vehicle is moving.

9. The method of claim 1, wherein the performing of the localization comprises:
determining a set of particles using the particle-filter based localization method; and
iteratively refining the set of particles using the particle-filter based localization method, the particles of the set after one or more individual iterations representing updated estimated poses of the vehicle compared to the set of particles in one or more previous iterations.

10. The method of claim 1, further comprising refining the particle-filter based localization by at least matching a first point cloud corresponding to the map with a second point cloud obtained by a light detection and ranging (LIDAR) sensor mounted on the vehicle.

11. A processor comprising:
processing circuitry to cause performance of operations comprising:
identifying a region within a map based at least on the region corresponding to an area that is within a threshold distance from a determined location of a vehicle;
identifying a road associated with the map that includes at least a portion located within the region, the identifying of the road being based at least on one or more navigable boundaries corresponding to the road, the identifying of the one or more navigable boundaries being based at least on one or more polylines that are at least partially defined based at least on two or more structures;
determining a search space within the map representing an intersection of the region and the road such that the search space is limited to a segment of the road;
performing localization with respect to the vehicle based at least on the search space, wherein the localization is limited to considering locations within the search space and wherein the localization is a particle-filter based localization method that includes determining a plurality of estimated poses that are limited to locations within the search space and in which one or more individual particles used in the particle-filter based localization method represent a respective estimated pose of the estimated poses; and
causing performance of one or more autonomous driving control operations by the vehicle based at least on the localization.

12. The processor of claim 11, wherein the determined location includes a global navigation satellite system (GNSS)-based geographic location of the vehicle.

13. The processor of claim 12, wherein the threshold distance is based at least on an accuracy of the GNSS-based geographic location of the vehicle.

14. The processor of claim 11, wherein the determined location is based at least on an input provided via a user interface.

15. The processor of claim 11, wherein the region is modified in response to a determination that no roads are within the threshold distance from the vehicle.

16. The processor of claim 11, the identifying of the region further comprises identifying, based at least on the threshold distance, a defined region surrounding the determined location of the vehicle.

17. The processor of claim 11, wherein the identifying of the road comprises:
determining one or more perpendicular distances between the determined location of the vehicle and one or more roads; and
identifying the road from the one or more roads as being nearest to the determined location of the vehicle based at least on the one or more perpendicular distances.

18. The processor of claim 11, wherein at least one of the particles is evaluated using a nearest-point computation and is assigned a weight corresponding to distance of the nearest-point computation.

19. The processor of claim 17, wherein the determining of the search space comprises:
including, in the search space, first navigable boundaries of one or more first lanes of the road, wherein the one or more first lanes correspond to a direction of travel that matches a direction in which the vehicle is moving; and
excluding, from the search space, second navigable boundaries of one or more second lanes of the road, wherein the one or more second lanes correspond to a direction of travel that is opposite of the direction in which the vehicle is moving.

20. The processor of claim 19, wherein the operations further comprise determining one or more of: an altitude, a roll, or a pitch of the vehicle based at least on the first navigable boundaries of the one or more first lanes having the direction of travel that matches the direction in which the vehicle is moving.

21. The processor of claim 11, wherein the performing of the localization comprises:
determining a set of particles using the particle-filter based localization method; and
iteratively refining the set of particles using the particle-filter based localization method, the particles of the set after one or more individual iterations representing updated estimated poses of the vehicle compared to the set of particles in one or more previous iterations.

22. The processor of claim 11, wherein the limiting of the localization to considering locations within the search space includes limiting estimated poses corresponding to performing the localization to locations within the search space.

23. A system comprising:
one or more processors comprising processing circuitry configured to cause performance of operations comprising:
identifying a road associated with a map that includes at least a portion located within a region that is within a threshold distance from a determined location of a vehicle, the identifying of the road being based at least on one or more navigable boundaries corresponding to the road, the identifying of the one or more navigable boundaries being based at least on one or more polylines that are at least partially defined based at least on two or more structures;
determining a search space within the map representing an intersection of the region and the road such that the search space is limited to a segment of the road;

performing localization with respect to a vehicle based at least on the search space, wherein the localization is a particle-filter based localization method that includes determining a plurality of estimated poses that are limited to locations within the search space and in which one or more individual particles used in the particle-filter based localization method represent a respective estimated pose of the estimated poses, at least one of the particles being evaluated using a nearest-point computation; and causing performance of one or more driving operations corresponding to the vehicle based at least on the localization.

24. The system of claim 23, wherein the determined location includes a global navigation satellite system (GNSS)-based geographic location of the vehicle and the threshold distance is based at least on an accuracy of the GNSS-based geographic location of the vehicle.

25. The system of claim 23, wherein the determined location is received based at least on an input provided via a user interface.

26. The system of claim 23, wherein the region is modified in response to a determination that no roads are within the threshold distance from the vehicle.

27. The system of claim 23, wherein identifying the region comprises identifying, based at least on the threshold distance, a circular region surrounding the determined location of the vehicle.

28. The system of claim 23, wherein the identifying of the road further comprises:
   determining one or more perpendicular distances between the determined location of the vehicle and one or more roads; and
   identifying the road from the one or more roads based at least on the road being nearest to the determined location of the vehicle based at least on the one or more perpendicular distances.

29. The system of claim 28, wherein the determining of the search space further comprises:
   including, in the search space, first navigable boundaries of one or more first lanes of the road that correspond to a direction of travel that matches a direction in which the vehicle is moving; and
   excluding, from the search space, second navigable boundaries of one or more second lanes of the road that correspond to a direction of travel that is opposite of the direction in which the vehicle is moving.

30. The system of claim 29, wherein the operations further comprise determining one or more of: an altitude, a roll, or a pitch of the vehicle based on the first navigable boundaries of the one or more first lanes.

31. The system of claim 23, wherein the performing of the localization comprises:
   determining a set of particles using the particle-filter based localization method; and
   iteratively refining the set of particles using the particle-filter based localization method, the particles of the set after one or more individual iterations representing updated estimated poses of the vehicle compared to the set of particles in one or more previous iterations.

32. The system of claim 23, wherein the operations further comprise:
   refining the particle-filter based localization by at least matching a first point cloud corresponding to the map with a second point cloud obtained by a light detection and ranging (LIDAR) sensor mounted on the vehicle.

33. The system of claim 23, wherein at least one of the particles is assigned a weight corresponding to distance of the nearest-point computation.

* * * * *